US007424600B2

(12) United States Patent
Yamamoto

(10) Patent No.: US 7,424,600 B2
(45) Date of Patent: Sep. 9, 2008

(54) INFORMATION PROCESSING APPARATUS, INFORMATION PROCESSING METHOD, AND PROGRAM CONVERSION APPARATUS, IN WHICH STACK MEMORY IS USED WITH IMPROVED EFFICIENCY

(75) Inventor: Yasunori Yamamoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1005 days.

(21) Appl. No.: 10/624,901

(22) Filed: Jul. 23, 2003

(65) Prior Publication Data
US 2005/0102491 A1 May 12, 2005

(30) Foreign Application Priority Data
Jul. 24, 2002 (JP) ............................. 2002-215394

(51) Int. Cl.
G06F 9/30 (2006.01)
(52) U.S. Cl. ......................... 712/300; 712/202; 712/220
(58) Field of Classification Search .................. 712/220, 712/202, 300
See application file for complete search history.

(56) References Cited

U.S. PATENT DOCUMENTS 3,987,412 A * 10/1976 Morrin, II .................... 382/242
5,241,679 A 8/1993 Nakagawa et al.

* cited by examiner

*Primary Examiner*—Tonia L. M. Dollinger
(74) *Attorney, Agent, or Firm*—McDermott Will & Emery LLP

(57) ABSTRACT

The information processing apparatus includes: a process unit having one or more registers that retain data used for calculation; a compression unit that compresses and saves the content in the register to a stack memory; and a decompression unit that decompresses and restores the data saved in the stack memory, to the corresponding registers. If a first decoding unit included in the process unit has decoded a call instruction which is assigned a compression control bit, the compression unit, in executing the call instruction, performs compression before saving the content of the registers to the stack memory. If a second decoding unit included in the process unit has decoded a return instruction which is assigned a decompression control bit, the decompression unit, in executing the return instruction, performs decompression before restoring the content saved in the stack memory to the registers.

16 Claims, 26 Drawing Sheets

FIG.2

```
11a  main()
     {
       func_a();
       func_b();
       func_e();
     }

11b  func_a()
     {
       func_c();
     }

11c  func_b()
     {
        if(X){
                func_c();
        }else{
                func_d();
        }
     }

11d  func_d()
     {
        |
      asm("load r0,(4,sp)");
      asm("and  r0,0xf0");
      asm("store (4,sp),r0");
        |
     }

11e  func_e()
     {
11f  #STACK_COMPRESS

}

11g  func_f()
     {
        |
     }
```

FIG.3

```
12a ─┬─func_c()
     {
       func_f();
     }
```

FIG.5

| FUNCTION NAME | FUNCTION EVALUATION VALUE |
|---|---|
| func_a | 1 |
| func_b | 1 |
| func_c | 1 |
| func_d | 0 |
| func_e | 2 |
| func_f | 1 |

FIG.6

| | HIGHER ORDER ←――――――→ LOWER ORDER | | | TREE NUMBER |
|---|---|---|---|---|
| main | func_a | func_c | func_f | 1 |
| | func_b | func_c | func_f | 2 |
| | | func_d | | 3 |
| | func_e | | | 4 |

FIG.8

```
_0main
  |
  call_0func_a,[r0:r7],stack compress         ← 301
  call_0func_b,[r0:r7]
  call_0func_e,[r0:r7],stack compress         ← 302
  |
  ret
_0func_a
  |
  call_0func_c[r0:r7]
  |
  ret,[r0:r7],stack compress                  ← 303
_0func_b
  |
  if
    call_0func_c,[r0:r7]
  else
    call_0func_d,[r0:r7]
  |
  ret,[r0:r7]
_0func_c
  |
  call_0func_f,[r0:r7]
  |
  ret,[r0:r7]
_0func_d
  |
  load r0,(4,sp)
  and r0,0xf0
  store(4,sp),r0
  ret,[r0:r7]
  |
  ret,[r0:r7]
_0func_e
  |
  ret,[r0:r7],stack compress                  ← 304

_0func_f
  |
  ret,[r0:r7]
```

FIG.9

```
_0main
  |
  call_0func_a
  |
  ret
_0func_a
305 ~   sotre (sp),[r0:r7],stack compress
  |
  call_0func_c
  |
306 ~   load [r0:r7],(sp),stack compress
  ret
```

FIG.14

| PC |
|---|
| r0:0x80000110 |
| r1:0x00000000 |
| r2:0x0000FFFF |
| r3:0x00000000 |
| r4:0x80000010 |
| r5:0x80000014 |
| r6:0x50000010 |
| r7:0x50000000 |

FIG.16

| VALUE | HUFFMAN-CODE |
|---|---|
| 0x4 | 0b00000 |
| 0x5 | 0b00001 |
| 0x8 | 0b0001 |
| 0xf | 0b001 |
| 0x1 | 0b01 |
| 0x0 | 0b1 |

INFORMATION PROCESSING APPARATUS, INFORMATION PROCESSING METHOD, AND PROGRAM CONVERSION APPARATUS, IN WHICH STACK MEMORY IS USED WITH IMPROVED EFFICIENCY

BACKGROUND OF THE INVENTION (1) Field of the Invention

The present invention relates to a technology for saving data from a register to a stack memory in response to call of functions.

(2) Related Art

In calling another function during execution of a function, a computer saves to its stack memory such things as the address of the function currently executed, and data retained in its register. Upon termination of execution of the called function, the computer restores the saved data from the stack memory to the register, and returns the process to the address restored from the stack memory.

However, if all the registers are to be saved, it will increase the number of cycles and the capacity of the stack memory that are required for saving them. This will lead to a deterioration of the system performance.

In view of reducing the number of cycles required for calling a function, a Japanese Laid-open Patent application H08-305581 discloses a program conversion apparatus and a processor, by which call subroutines disposed in different files are called from the calling routines, without causing disorder to the pipelines.

In view of reducing the capacity of stack memory required for saving, there has already been a technology for reducing the number of registers to be saved, by targeting only a guaranteed register which requires the values to be guaranteed before and after another function is called. One example thereof is a U.S. Pat. No. 5241679. which discloses a technology for selectively specifying registers to be saved to a stack memory.

These days, as programs become large in scale, the number of registers owned by a processor tends to increase as well. Accordingly, even for saving only the guaranteed registers to a stack memory, the amount of data to be saved will be large. In view of this, it is an issue to mount a large-capacity stack memory to a processor, for avoiding overflow at the stack memory.

SUMMARY OF THE INVENTION

The object of the present invention is to provide an information processing apparatus, an information processing method, and a program conversion apparatus, which enable users to use the stack memory with improved efficiency thereby restraining possibility of overflow of the stack memory, and so realize memory-saving.

In order to achieve the aforementioned object, the present invention provides an information processing apparatus including a processor that has at least one register and performs processing according to a machine language program, the register retaining data used in computation, the information processing apparatus having: a compression judgment unit operable to judge whether the machine language program has information indicating that the data retained in the register should be compressed and then saved to a stack memory in response to call of a predetermined function; and a save unit operable to, when the judgment by the compression judgment unit is affirmative, compress and then save the data retained in the register to the stack memory in response to call of the predetermined function.

With the stated construction, it becomes possible to compress data that is to be saved to the stack memory in response to call of the predetermined function, thereby reducing the amount of data to be stored in the stack memory.

Accordingly, the construction enables users to use the stack memory with improved efficiency thereby restraining possibility of overflow of the stack memory, and so realizes memory-saving.

Here, the aforementioned information processing apparatus may further have: a decompression judgment unit operable to judge whether or not there is decompression information indicating that the data saved in the stack memory should be decompressed and then restored to the register in response to termination of the call of the predetermined function; and a restore unit operable to, when the judgment by the decompression judgment unit is affirmative, decompress and then restore to the register the data saved in the stack memory in response to termination of the call of the predetermined function.

With the stated constructions, it becomes possible to decompress the compressed data stored in the stack memory which is to be restored to the register in terminating a call of the predetermined function. Therefore, even though the data to be stored in the stack memory is reduced in amount, the value of the register is guaranteed before and after the predetermined function is called.

Moreover, the save unit may have: a data conversion subunit operable to convert first data retained in the register into second data according to a predetermined algorithm; a comparison subunit operable to compare the data size of the second data with a threshold value that shows compression efficiency; and a selective save subunit operable to, when the data size of the second data is smaller than the threshold value, save the second data to the stack memory, and when the data size of the second data is greater than the threshold value, save the first data to the stack memory.

With the stated construction, it becomes possible to compress data retained in the guaranteed register, and to, when there is a compression effect, save the compressed data to the stack memory. On the contrary, when there is no compression effect, it becomes possible to save the data in the guaranteed register as it is to the stack memory.

Therefore, the stack memory is used with improved efficiency even in a case where, in the guaranteed register, there is little relation between the data in bits, and so the compression efficiency is bad, without being influenced by the increase in size of the data resulted from a data conversion such as Huffman code.

Moreover, when the judgment by the compression judgment unit is affirmative, the save unit may compress and then save the data retained in the register to the stack memory when execution of a call instruction for calling the predetermined function, and when the judgment by the decompression judgment unit is affirmative, the restore unit may decompress and then restore to the register the data saved in the stack memory when execution of a return instruction for terminating the call of the predetermined function.

With the stated construction, it becomes possible to compress data to be saved to the stack memory in executing a call instruction for calling the predetermined function, and to decompress the data saved in the stack memory which is to be restored to the guaranteed register in executing a return instruction for terminating the call of the predetermined function.

Therefore, in the information processing apparatus which is required to save a guaranteed register in branching operation from a function to another function, even though the value of the register is guaranteed before and after the operation of the predetermined function, the amount of data to be stored in the stack memory can be reduced, and so the stack memory is used with improved efficiency.

Furthermore, when the judgment by the compression judgment unit is affirmative, the save unit may compress and then save the data retained in the register to the stack memory when a process for the predetermined function starts, and when the judgment by the decompression judgment unit is affirmative, the restore unit may decompress and then restore to the register the data saved in the stack memory when the process for the predetermined function finishes.

With the stated construction, it becomes possible to compress data retained in the guaranteed register when the guaranteed register is saved according to a store instruction, and to decompress the data saved in the stack memory when the guaranteed register is restored according to a load instruction.

Therefore, in the information processing apparatus which is not required to save a guaranteed register to a stack memory in branching operation from a function to another function, even though the value of the register is guaranteed before and after the operation of the predetermined function, the amount of data to be stored in the stack memory can be reduced, and so the stack memory is used with improved efficiency.

Moreover, in order to achieve the aforementioned object, the present invention provides an information processing method used with an information processing apparatus including a processor that has at least one register and performs processing according to a machine language program, the register retaining data used in computation, the information processing method having: a compression judgment step of judging whether the machine language program has information indicating that the data retained in the register should be compressed and then saved to a stack memory in response to call of a predetermined function; and a save step of, when the judgment at the compression judgment step is affirmative, compressing and then saving the data retained in the register to the stack memory in response to call of the predetermined function.

With the stated construction, it becomes possible to compress data retained in the register which is to be saved to the stack memory in response to call of a function, thereby reducing the amount of data to be stored in the stack memory.

Accordingly, the construction enables users to use the stack memory with improved efficiency thereby restraining possibility of overflow of the stack memory, and so realizes memory-saving.

Moreover, in order to achieve the aforementioned object, the present invention provides a program conversion apparatus having: an acquisition unit operable to acquire an input program that includes one or more functions; a judgment unit operable to judge, from the input program, whether, in response to call of a predetermined function, data retained in at least one register of a processor should be compressed and then saved to a stack memory, or should be saved to the stack memory without being compressed; and a conversion unit operable to, when the judgment unit has judged that the data should be compressed and then saved, convert the input program into an output program that includes indication information, the indication information indicating, to the processor, that the data retained in the register should be compressed and then saved to the stack memory.

With the stated construction, it becomes possible not to set all functions as a compression-target function whose guaranteed register is to be compressed; and to selectively determine compression-target functions.

Therefore, the stated construction prevents large increase in number of cycles, that would result due to compressing a guaranteed register at every function, and so enhances usage efficiency of the stack memory.

Here, the judgment unit may include: a detection subunit operable to detect a stack access function in the input program, the stack access function referring to the stack memory in which the data in the register have been saved, and the judgment unit may judge that the data retained in the register should be saved to the stack memory without being compressed in response to call of any of the stack access function and functions that position higher order than the stack access function in a hierarchical structure of functions included in the input program.

With the stated construction, it becomes possible to exclude every function whose any lower-order function in its hierarchical structure is required to access the stack memory, from a target function whose guaranteed registers are to be compressed.

Therefore, such a case will not happen in which when any lower-order function has to refer to data stored in the stack memory, the data to be referred to has been compressed.

Here, the judgment unit may include: a pre-specification detection subunit operable to detect a pre-specified function in the input program, the pre-specified function being a function to which information indicating that the data retained in the register should be compressed and then saved to the stack memory has been added in advance, and the judgment unit may judge that the data retained in the register should be compressed and then saved to the stack memory in response to call of the pre-specified function.

With the stated construction, a function which is specified in advance in a pre-conversion program can be converted into a compression-target function in the post-conversion program.

Therefore, static determination of registers to be compressed is realized, in which a user specifies a compression-target function, at the time of programming or prior to compiling.

Here, the judgment unit may include: a nest information creation subunit operable to create nest information that shows a hierarchical structure of functions included in the input program, and when the predetermined function includes therein a subroutine, the judgment unit may judge whether, in response to call of the predetermined function, the data retained in the register should be compressed and then saved to the stack memory, or should be saved to the stack memory without being compressed, based on the nest information.

With the stated construction, it becomes possible to determine arbitrary functions, dynamically at the time of compiling, within a function group having a hierarchical structure.

Therefore, once data is saved to the stack memory, it becomes possible to set as compression-target functions the higher order functions in the hierarchical structure that are to be stored in the stack memory for a long time, and not to set as compression-target functions the lower functions in the hierarchical structure. With this arrangement, the number of cycles required for saving the guaranteed registers is not increased much, and so the stack memory is used with improved efficiency.

Here, the conversion unit may include: a compression information addition subunit operable to add, to a call instruction for calling the predetermined function, information indicating to the processor that the data retained in the register should be compressed and then saved to the stack memory when the predetermined function is called; and a decompression information addition subunit operable to add, to a return instruction for terminating the call of the predetermined function, information indicating to the processor that the data saved in the stack memory should be decompressed and then restored to the register when the call of the predetermined function is terminated.

With the stated construction, it becomes possible to add to the output program information indicating, in performing a call instruction, to compress data retained in the guaranteed register which is to be saved to the stack memory, and in performing a return instruction, to decompress the data saved in the stack memory which is to be restored to the guaranteed register.

Therefore, it becomes possible to generate a program by which, in the information processing apparatus which is required to save a guaranteed register to a stack memory in branching operation from a function to another function, even though the value of the register is guaranteed before and after the operation of the predetermined function, the amount of data to be stored in the stack memory can be reduced, and so the stack memory is used with improved efficiency.

Here, the conversion unit may include: a compression information addition subunit operable to add, to the predetermined function, information indicating to the processor that the data retained in the register should be compressed and then saved to the stack memory when a process for the predetermined function starts; and a decompression information addition subunit operable to add, to the predetermined function, information indicating to the processor that the data saved in the stack memory should be decompressed and then restored to the register when the process for the predetermined function finishes.

With the stated construction, it becomes possible to add to the output program, information indicating to compress data retained in the guaranteed register when the guaranteed register is saved according to a store instruction, and to decompress the data saved in the stack memory when the guaranteed register is restored according to a load instruction.

Therefore, it becomes possible to generate a program by which, in the information processing apparatus which is not required to save a guaranteed register to a stack memory in branching operation from a function to another function, even though the value of the register is guaranteed before and after the operation of the predetermined function, the amount of data to be stored in the stack memory can be reduced, and so the stack memory is used with improved efficiency.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 2 is a schematic diagram showing one example of the source file 11;

FIG. 3 is a schematic diagram showing one example of the source file 12;

FIG. 5 is a diagram showing a data structure of a selection alternative table 123a retained in a selection alternative information retain unit 123;

FIG. 6 is a diagram showing a tree structure of functions having a calling relation with each other;

FIG. 8 is a schematic diagram showing the content of the execution file 20;

FIG. 9 is a schematic diagram showing the content of the execution file when the called side performs save/restore for a register after the branching is performed;

FIG. 14 is a schematic diagram showing the stack memory 231 in which data is saved from the guaranteed register 225a;

FIG. 16 is a table used in Huffman code method;

FIG. 18 is a diagram showing bit allocation for the CSR250;

FIG. 22 is a flow chart showing how to create a selection alternative table 123a;

FIG. 26 is a chart showing the flow of the operations of terminating a function and the following restoring of the guaranteed register 225a.

DESCRIPTION OF THE PREFERRED EMBODIMENTS

<Overview>

The present invention realizes efficient use of stack memory at the time of saving the guaranteed register which is required when a function is called, by compressing data retained in the guaranteed register.

The description starts with a program conversion apparatus 100 and related files, which are used to generate an execution file 20. This execution file 20 has information that indicates that data retained in the guaranteed register should be compressed in response to call of a function. Next, an information processing apparatus 200 that executes this execution file 20 will be described.

<Structure>

Figure 1:
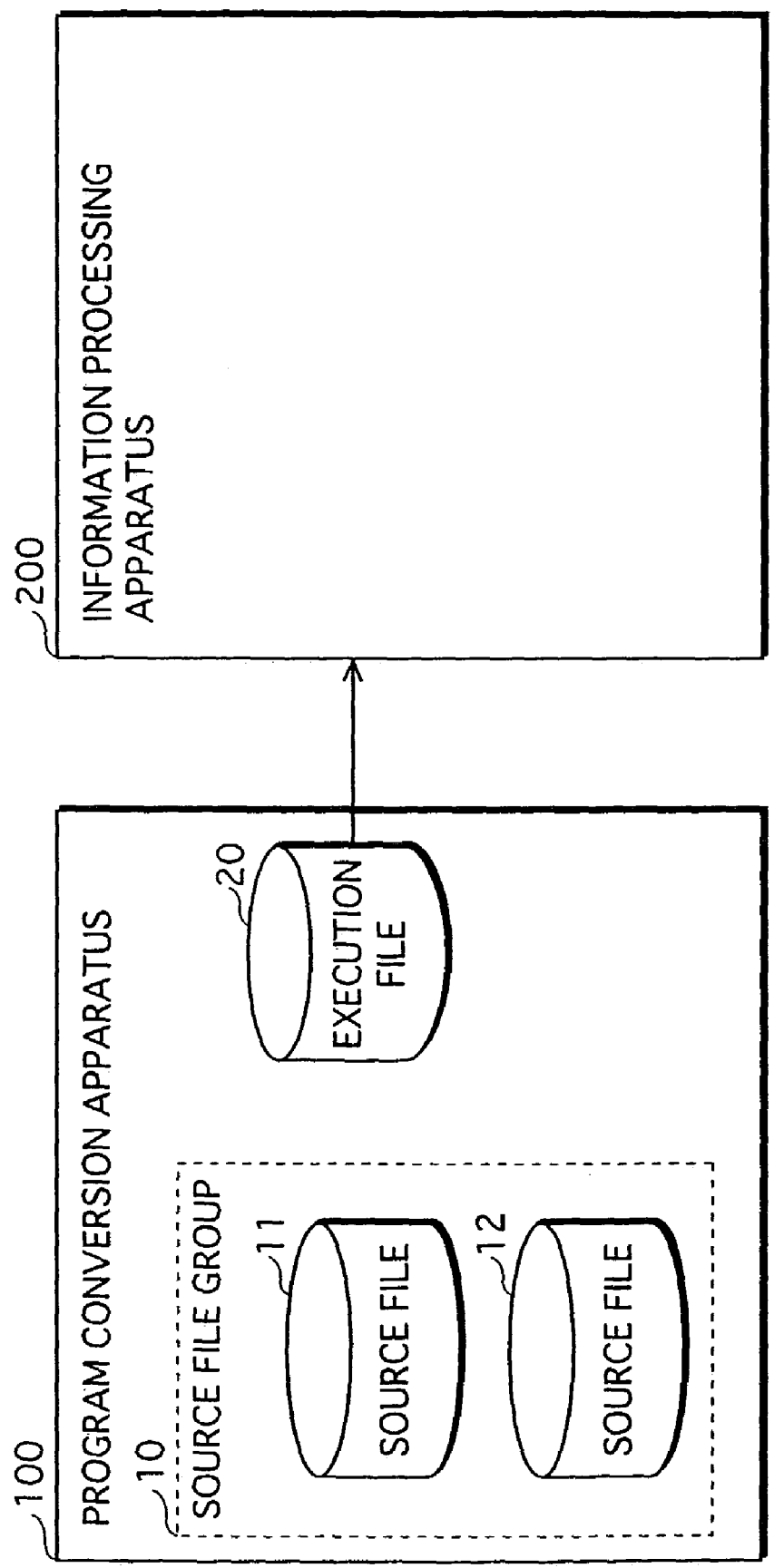
FIG. 1 is a diagram showing the structure of an information processing system equipped with a program conversion apparatus and an information processing apparatus that relate to the embodiment of the present invention.

FIG. 1 is a diagram showing the structure of an information processing system that includes a program conversion apparatus and an information processing apparatus that relate to the embodiment of the present invention.

The information processing system shown in this figure is comprised of a program conversion apparatus 100 and an information processing apparatus 200. The program conversion apparatus 100 converts a source file group 10 to generate an execution file 20, and the information processing apparatus 200 executes the generated execution file 20.

(Source Files)

In this embodiment, the source file group 10 is comprised of two files: a source file 11, and a source file 12.

Figure 3:
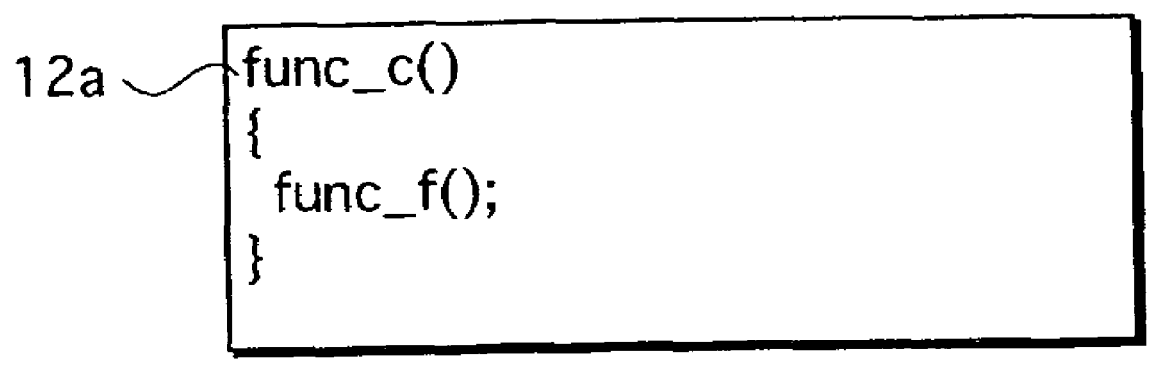

FIG. 2 and FIG. 3 are schematic diagrams, respectively showing one example of the source file 11 and the source file 12.

Both of the source files 11 and 12 are a program file written in a high-level programming language. The source file 11 includes the following areas: a description area 11a that relates to a function "main", a description area 11b that relates to a function "func_a", a description area 11c that relates to a function "func_b", a description area 11d that relates to a function "func_d", a description area 11e that relates to a function "func_e", and a description area 11g that relates to a function "func_f". The source file 12 includes a description area 12a that relates to a function "func_c". The function group described here has a tree structure in which processes can be branched by calling/returning.

In the description area 11a relating to the function "main" instructions respectively calling "func_a", "func_b", and "func_e" are described. In the description area 11b relating to "func_a", an instruction for calling "func_c" is described. In the description area 12a relating too "func_c", an instruction for calling "func_f" is described. In the description area 11c relating to "func_b", two instructions for respectively calling "func_c" and d"func_d", and a judgment for, on a predetermined condition X, branching to one of the two instructions are described. In the description area 11d relating to "func_d", the following three instructions are described as inline assembler: a load instruction for transferring, to the register r0, a memory content in a four-byte higher order address than the address indicated by the stack pointer, an AND operation instruction for storing, into the register r0, the logical product of the data retained in the register r0 and "0xf0", and a store instruction for transferring the data retained in the register r0 to the four-byte higher order address than the address indicated by the stack pointer. The description area 11e relating to "func_e" includes a description area 11f for a pragma #STACK_COMPRESS. In the present embodiment, the pragma #STACK_COMPRESS is a kind of pragma that indicates, to the program conversion apparatus 100, that the data to be saved from the guaranteed register to the stack memory, in response to call of a function, should be compressed.

(Program Conversion Apparatus)

Figure 4:
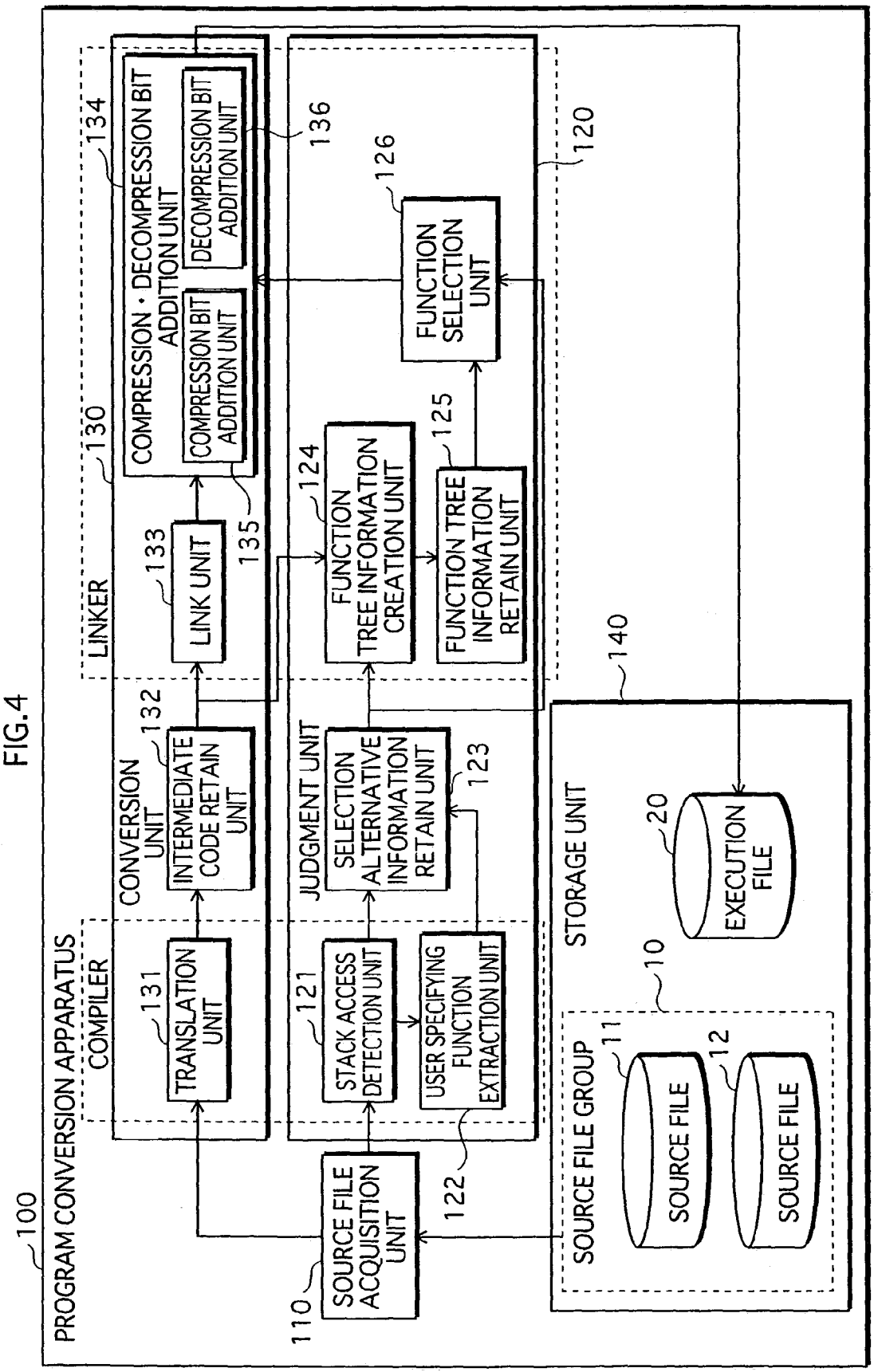
FIG. 4 shows a structure of the program conversion apparatus relating to the embodiment of the present invention.

FIG. 4 shows a function and a structure of the program conversion apparatus relating to the embodiment of the present invention.

The program conversion apparatus 100 is actually a computer system made up of a processor, a RAM, and a ROM in which a program is written, and the like. The function thereof may be realized by making the processor execute a program written in the ROM, or the program conversion apparatus 100 may be a wired logic, or an ASIC. The program conversion apparatus 100 includes a source file acquisition unit 110, a judgment unit 120, a conversion unit 130, and a storage unit 140, which each are a function block.

The source file acquisition unit 110 acquires a source file 11 and a source file 12 that are retained in the storage unit 140, and hands the acquired source files 11 and 12 to the judgment unit 120, and to the conversion unit 130.

The judgment unit 120 includes therein a stack access detection unit 121, a user-specified function extraction unit 122, a selection alternative information retain unit 123, a function tree information creation unit 124, a function tree information retain unit 125, and a function selection unit 126. This judgment unit 120 is, operable to judge whether to compress the data retained in the register that is to be saved to the stack memory in response to call of a function, and to determine such functions (hereinafter "compression-target function").

The stack access detection unit 121 examines the processing of each function described in each of the source files 11 and 12, for detecting functions that include a processing for referencing to the addresses that are higher order than the value of the stack pointer at the initiation time of the process of the function. In a selection alternative table 123a retained in the selection alternative information retain unit 123, the stack access detection unit 121 writes a name and a function evaluation value of the detected function. Here, the function evaluation value for the detected function is written as "0".

The user-specified function extraction unit 122 searches for a description of pragma #STACK_COMPRESS, within functions that are described in the source files 11 and 12 and that are not written in the selection alternative table 123a. For functions detected to have the pragma #STACK_COMPRESS, the user-specified function extraction unit 122 sets the function evaluation value thereof to be "2", and writes in the selection alternative table 123a the name and the function evaluation value of the aforementioned functions. As for functions detected not to have the pragma #STACK_COMPRESS, the user-specified function extraction unit 122 sets the function evaluation value thereof to be "1", and writes in the selection alternative table 123a the name and the function evaluation value of the aforementioned functions.

The selection alternative information retain unit 123 is specifically a part of the memory area of the RAM, and retains the selection alternative table 123a.

FIG. 5 shows the data structure of the selection alternative table 123a retained in the selection alternative information retain unit 123.

The selection alternative table 123a includes pieces of selection alternative information in same number as functions included in the source file group 10. Each piece of selection alternative information is associated with a function in one-to-one relation, and is composed of a function name 123b and a function evaluation value 123c. The function evaluation value 123c is one of the values: 0, 1, and 2. The function evaluation value 123c is 0 for a function having a processing for accessing a stack memory that has a higher order address than the address shown by the stack pointer at the initiation time of the function. The aforementioned function is required to refer to a stack memory in which a value for a guaranteed register has been already stored due to call of a function. A function detected to have description of the pragma #STACK- _COMPRESS at the user-specified function extraction unit 122 has a function evaluation value 123c of 2, and other functions other than the aforementioned 2 kinds has a function evaluation value 123c of 1.

First, the function tree information creation unit 124 detects the function having the lowest order function within the intermediate code group retained in the intermediate code retain unit 132. Next, the function tree information creation unit 124 extracts a calling relation of functions up to the highest order function within the function "main" that is the main routine, as a branch of the tree structure. The function tree information creation unit 124 then adds a tree number to each extracted branch, and writes the tree number and tree evaluation value into a function tree information table 125a retained in the function tree information retain unit 125. This tree evaluation value is a summation value of function evaluation values 123c of all the functions making up the branch.

FIG. 6 shows a tree structure of functions having a calling relation with each other. Relative to a particular function, a function that positions in the left direction on the horizontal axis in the diagram which is calling the particular function is called a higher order function in the tree structure. Likewise, a function that positions in the right direction on the horizontal axis which is called by the particular function is called a lower order function in the tree structure. Note here that the top function of each subroutine called by the function main which is a main routine is called the highest order function of a branch in the tree structure.

In this embodiment, as shown in FIG. 6, three functions "func_a", "func_b", and "func_c" are called the highest order functions of each branch. As you can see, these functions have been respectively called by the function main which is the main routine. The function tree information creation unit 124 extracts, from the intermediate code group of the present embodiment, a branch 1 that includes "func_a", "func_c", and "func_f", a branch 2 that includes "func_b", "func_c", and "func_f", a branch 3 that includes "func_b" and "func_d", and a branch 4 that only includes "func_e".

The function tree information retain unit 125 is actually a part of the memory area of the RAM, and retains a function tree information table 125a.

Figure 7:
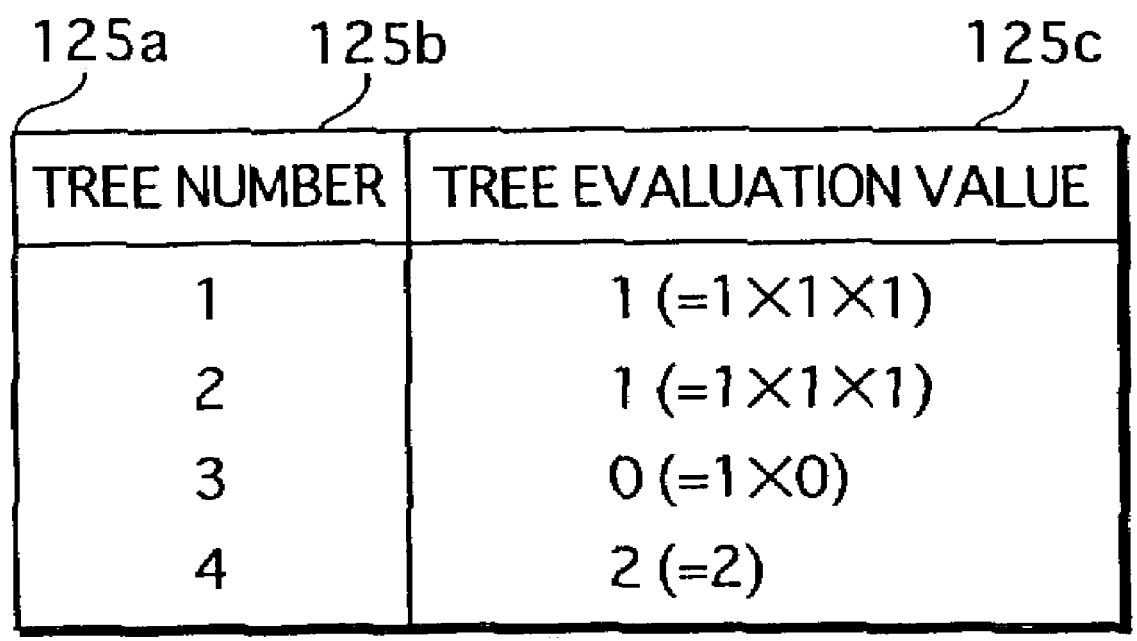
FIG. 7 is a diagram showing a data structure of the function tree information table 125a retained in the function tree information retain unit 125.

FIG. 7 shows the data structure of the function tree information table 125a retained in the function tree information retain unit 125.

The function tree information table 125a includes pieces of branch information in same number as branches of the tree structure that the function tree information creation unit 124 extracted from the intermediate code group. Each piece of branch information is associated with a branch in the tree structure in one-to-one relation, and is composed of a tree number 125b and a tree evaluation value 125c. The tree evaluation value 125c is obtained by multiplying the function evaluation values 123c of all the functions constituting the particular branch.

In the present embodiment, as shown in FIG. 7, four pieces of branch information are included in the function tree information table 125a, which respectively have tree numbers 125b of 1, 2, 3, and 4.

The function selection unit 126 selects the following as compression-target functions: the highest order function of each branch that is associated with branch information whose tree evaluation value 125c is not 0; and all the functions whose function evaluation value 123c is 2 in the selection alternative table 123a. Then, the function selection unit 126 notifies a compression decompression bit addition unit 134 of the selected compression-target functions. Note here that a branch whose tree evaluation value 125c is not 0 is a branch that does not include any function that is required to refer to a stack memory in which a value of a guaranteed register has been already stored due to call of a function, and that the a function whose function evaluation value 123c is 2 is a function which has received a user specification.

The conversion unit 130 includes therein a translation unit 131, an intermediate code retain unit 132, a link unit 133, and a compression-decompression bit addition unit 134, and is operable to convert a source file 11 and a source file 12, into an execution file 20.

The translation unit 131 generates instructions in machine language using each function described in the source files 11 and 12. The generated instructions in machine language include such as an instruction for performing process within the function, a call instruction for branching a process from a calling function, and a return instruction for returning the process to the calling function. In the above way, the source files 11 and 12 are converted into an intermediate code group in machine language. The translation unit 131 outputs the intermediate code group to the intermediate-code-retain unit 132.

The intermediate code retain unit 132 is specifically a part of the memory area of the RAM, and retains intermediate code group in machine language outputted from the translation unit 131.

The link unit 133 is a linker that adds relocation information and the like to the intermediate code group that the intermediate code retain unit 132 retains, and outputs, to the compression-decompression bit addition unit 134, machine language codes which are generated by linking intermediate codes in the intermediate code group and are executable.

The compression-decompression bit addition unit 134 includes therein a compression bit addition unit 135 and a decompression bit addition unit 136, and generates an execution file 20 by adding a compression control bit and a decompression control bit to the machine language codes outputted from the link unit 133. The compression-decompression bit addition unit 134 then sends the generated execution file 20 to the storage unit 140.

The compression bit addition unit 135 adds, to a call instruction for calling a function that the function selection unit 126 notified of to be a compression-target function, among the machine language codes, a compression control bit of 1 bit. This compression control bit of 1 bit indicates that the content of the guaranteed register should be compressed.

The decompression bit addition unit 136 adds, to a return instruction for terminating a function that the function selection unit 126 notified of to be a compression-target function among the machine language codes, a decompression control bit of 1 bit. This decompression control bit of 1 bit indicates that the content of the stack memory should be decompressed.

The storage unit 140 is a recording medium such as an HDD, that a user can freely operate its files, and records thereon the source file group 10 and the execution file 20 that the compression-decompression bit addition unit 134 outputted.

FIG. 8 is a diagram schematically showing the content of the execution file 20.

In the execution file 20, a call instruction 301 for branching to func_a, and a call instruction 302 for branching to func_e are respectively assigned a compression control bit, and a return instruction 303 for returning from func_a and a return instruction 304 for returning from func_e are respectively assigned a decompression control bit.

Here, a call instruction is written in mnemonic such as "CALLlabel, Regs", and shows that data retained in the guaranteed register "Regs" is to be saved to the stack memory, and that the process will be branched to "label". "CALL label, Regs, stack_compress" that is assigned one bit of compression control bit shows that the data retained in the guaranteed register "Regs" should be compressed and saved to the stack memory, and that the process will be branched to the "label".

A return instruction is written in mnemonic such as "RET Regs", and shows that data having been saved in the stack memory should be restored to the guaranteed register "Regs", and that the process should be branched to the address saved in the stack memory. "RET Regs,stack_compress" is a return instruction which is assigned 1 bit of decompression control bit, and shows that data saved in the stack memory should be decompressed and be restored to the guaranteed register "Regs", and further that the process should be branched to the address saved in the stack memory.

Note here that the present embodiment has a structure that shows a guaranteed register to be saved and restored, in performing call instructions and return instructions. However, another structure is also possible, where there is shown a guaranteed register to be saved and restored, prior to performing branching and at the time of executing a store instruction and a load instruction. Furthermore, it is also possible to save/restore a guaranteed register after branching is performed at the called side. In these cases, one-bit information "stack_compress" is added to a store instruction and to a load instruction, the "stack_compress" showing whether to compress or decompress the content of the guaranteed register, in response to calling of and terminating of the call of a function, are respectively performed.

FIG. 9 is a diagram schematically showing the content of the execution file when the called side performs save/restore for a guaranteed register after the branching is performed.

In FIG. 9, a compression control bit is added to a store instruction 305 for, when initiating process of func_a, transferring the data retained in the guaranteed registers r0-r7 to the address indicated by the stack pointer. On the contrary, a decompression control bit is added to a load instruction 306 for, when terminating process of func_a, transferring the memory content indicated by the stack pointer to the guaranteed registers r0-r7.

It should be noted here that in the present embodiment, the guaranteed registers that are to be saved are eight registers r0-r7. However, the guaranteed registers should not be limited to such eight registers, and other number of registers may be guaranteed registered too.

Further in the program conversion apparatus 100 of the present embodiment, the place where the intermediate code group in machine language having been converted by the translation unit 131 is retained is the intermediate code retain unit 132. However, such intermediate code group may also be stored in the storage unit 140 as an intermediate file, or may also be outputted to an external recording medium.

In addition, in the program conversion apparatus 100 of the present embodiment, the source file group 10 is retained in the storage unit 140. However, the source file group 10 may be acquired from an external recording medium.

In addition, in the present embodiment, the program conversion apparatus 100 outputs the execution file 20 to the storage unit 140. However, another structure is also possible in which the execution file 20 is outputted to an external recording medium.

(Information Processing Apparatus)

Figure 10:
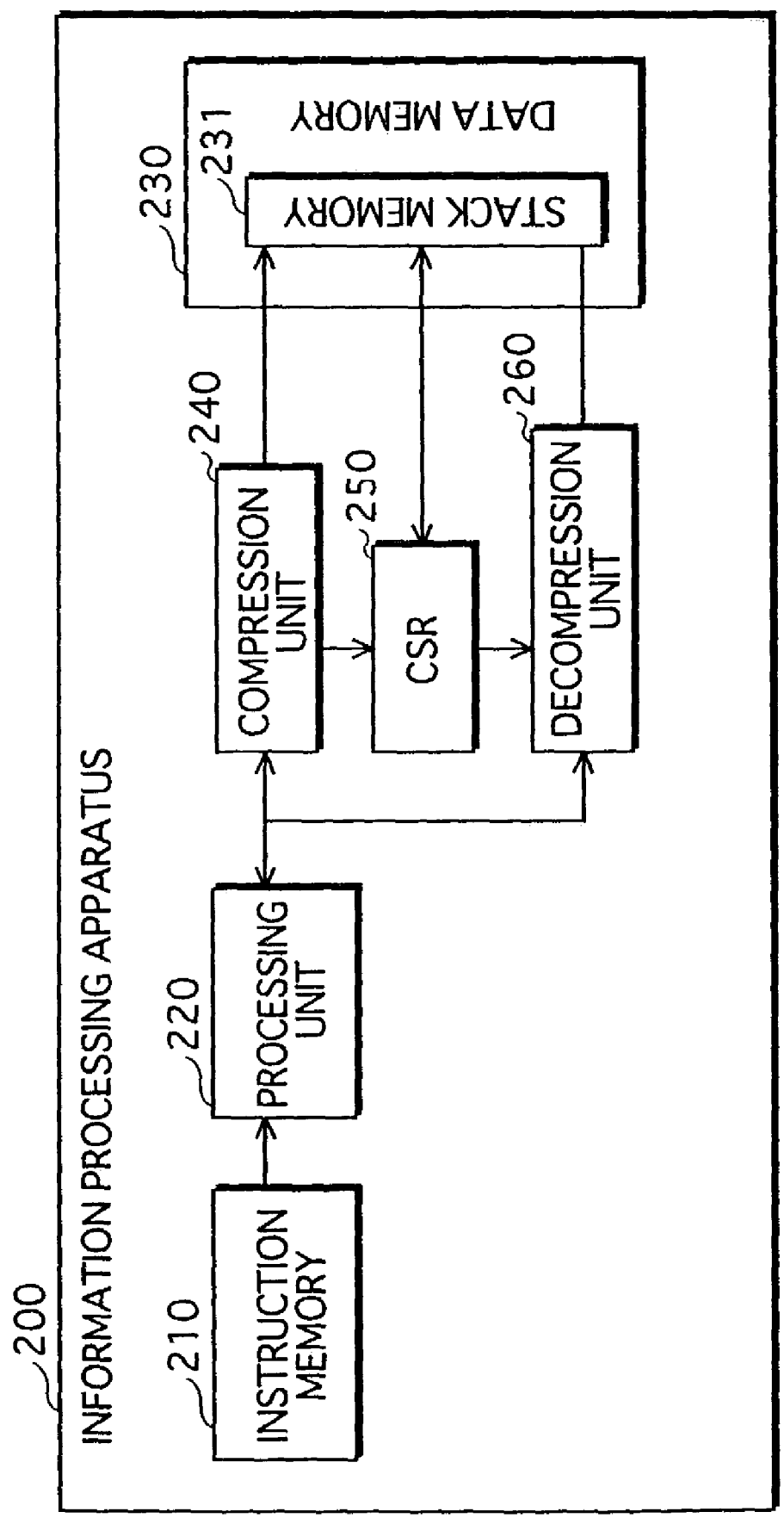
FIG. 10 is a diagram showing the structure of an information processing apparatus that relates to the embodiment of the present invention.

FIG. 10 is a diagram showing the structure of the information processing apparatus that relates to the embodiment of the present invention. The information processing apparatus 200 is composed of an instruction memory 210, a processing unit 220, a data memory 230, a compression unit 240, a CSR250, and a decompression unit 260.

The instruction memory 210 is actually a part of the memory area of the RAM, and stores therein an execution file 20 that includes compression-decompression bits generated by the program conversion apparatus 100.

The processing unit 220 is a processor that decodes and executes the instructions included in the execution file 20.

Figure 11:
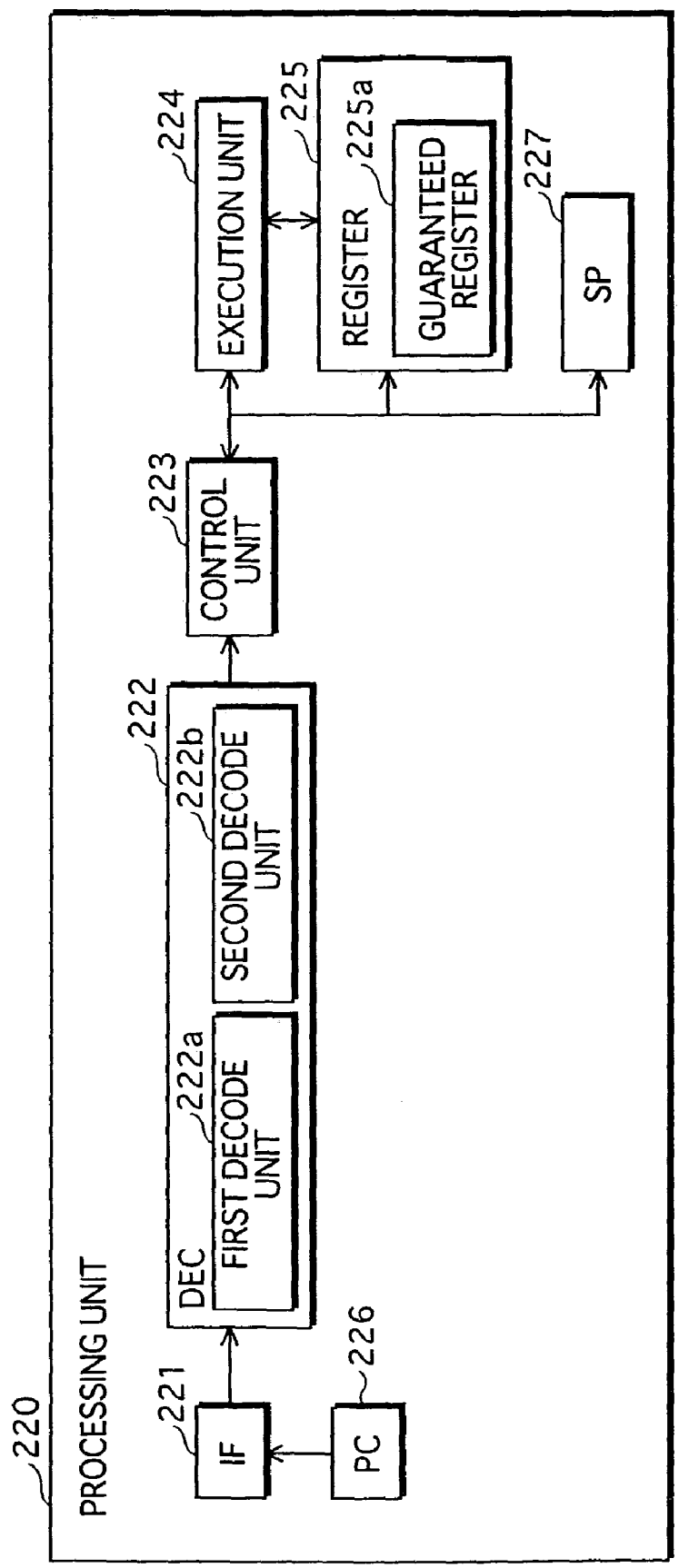
FIG. 11 shows the internal structure of a processing unit 220.

FIG. 11 shows the internal structure of the processing unit 220.

The processing unit 220 is composed of an IF221, a DEC222, a control unit 223, an execution unit 224, a register 225, a PC226, and an SP227.

The IF221 is an instruction fetch unit, and fetches a machine language instruction from the execution file 20 that is stored in the instruction memory 210, and hands the machine language instruction to the DEC222.

The DEC222 is an instruction decoder and analyzes machine language instructions. This DEC222 includes therein a first decode unit 222a and a second decode unit 222b. The first decode unit 222a decodes a call instruction that is assigned a compression control bit, and instructs to the control unit 223 to control compression of data that is retained in the register 225. The second decode unit 222b decodes a return instruction that is assigned a decompression control bit, and instructs to the control unit 223 to control decompression of data that is retained in the stack memory 231.

It should be noted here that in this embodiment, compression-decompression bits are respectively added to a call instruction and to a return instruction. However, it is also possible to add compression-decompression bits to a store instruction and to a load instruction. In such a case, the DEC222 will have different decode units than the first and second decode units (namely, third and fourth decode units). The third decode unit decodes a store instruction that is assigned a compression control bit, and the fourth decode unit decodes a load instruction that is assigned a decompression control bit.

Figure 12:
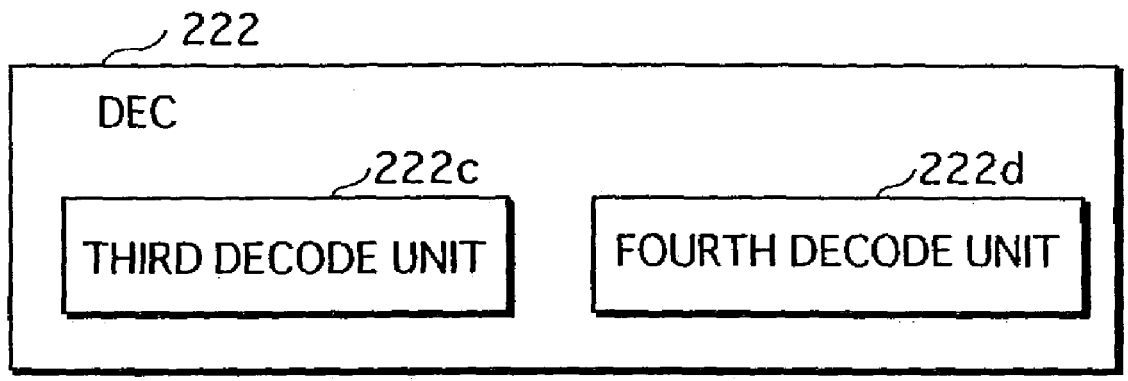
FIG. 12 shows the internal structure of a DEC222 that is structured to decode store instructions and load instructions that are respectively assigned compression-decompression control bits.

FIG. 12 shows the internal structure of the DEC222 that is structured to decode store instructions and load instructions that are respectively assigned compression-decompression control bits.

The control unit 223 shown in FIG. 11 controls the execution unit 224, the compression unit 240, and the decompression unit 260, according to a machine language instruction having been analyzed in the DEC222.

If, in performing a call instruction, the data in the guaranteed register. 225a should be compressed before saving the data to the stack memory 231, the data retained in the PC226 is first stored into the stack memory 231, then the data of the guaranteed register 225a after being compressed by the compression unit 240, and finally the data retained in the CSR250. Then, the process is controlled to branch to the called function.

If, in performing a return instruction, the data in the stack memory 231 should be decompressed before restoring the data to the guaranteed register 225a, the data in the CSR250 is first restored from the stack memory 231, then the data of the guaranteed register 225a whose size is shown by the CSR250 into the decompression unit 260, and finally the data in the PC226. Then, the process is controlled to branch to the calling function.

The execution unit 224 is a calculation unit for executing machine language instructions with the control of the control unit 223.

The register 225 has 32 recording apparatuses (r0-r31) that each have 32 bits. The register 225 retains data that execution unit 224 uses in calculation. A part of the register 225 is a guaranteed register 225a that has eight registers r0-r7, having total size of 256 bits. Data is saved to the stack memory 231 in performing a call instruction, and is restored from the stack memory when a return instruction is performed. In this way, the value will be guaranteed as that before the function is called.

The PC226 is a program counter, and retains the address of the instruction memory 210 that retains the machine language instruction currently executed.

The SP227 is a stack pointer and retains the top address of the free area of the stack memory 231.

The data memory shown in FIG. 10 is actually a part of the memory area of the RAM, and is a work memory for retaining data relating to the process of the execution file 20.

Figure 13:
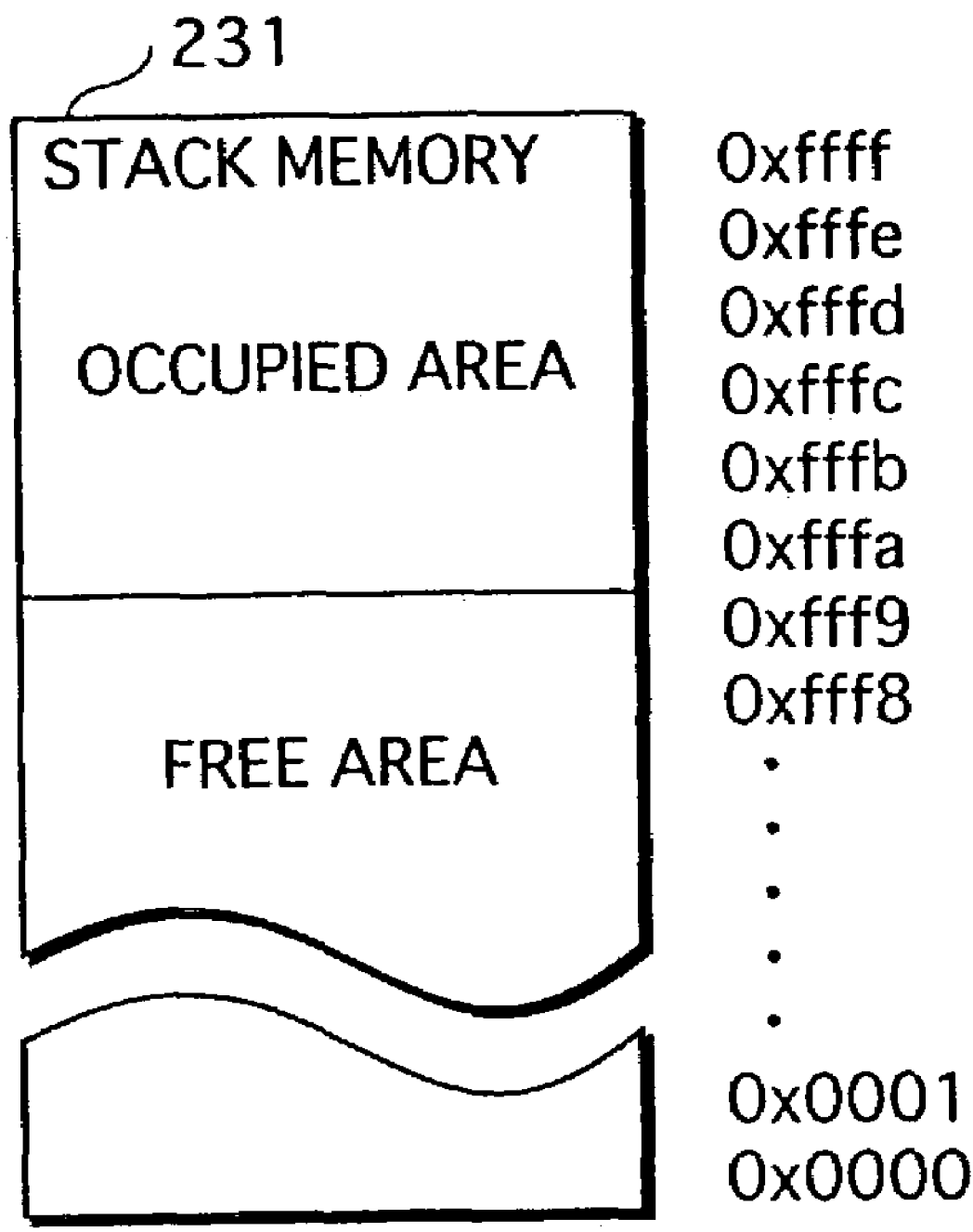
FIG. 13 is a schematic diagram showing a stack memory 231.

The stack memory 231 is an area of the data memory 230 and is used to store such as a return address of a function, a return address after there is an interrupt, and the value of the guaranteed register 225a. FIG. 13 is a diagram schematically showing the stack memory 231.

Note here that in this description, "0x??" shows that the value "??" is in hexadecimal number system; "0b??" shows that the value "??" is in binary number system.

"0xffff-0x0000" in the vertical axis represents addresses of the stack memory 231. When data is written in the stack memory 231, the first address to be used is "0xffff" which is the highest order address of the stack memory 231, and then sequentially moves to the lower order addresses. When retrieving data from the stack memory 231, the data will be retrieved from one address before the top address of the free area of the stack memory 231, and sequentially moved to the higher order address. Further, when data is stored into the stack memory 231, the SP227 will reduce the value it retains by the size of the data to be stored, and when data is retrieved from the stack memory 231, the SP227 will increase the value it retains by the size of the data to be retrieved. In this way, the SP227 always indicates the top address of its free area of the stack memory 231.

In the present embodiment, the stack memory 231 stores therein arguments of functions, and data of such as the PC226, the guaranteed register 225a, and the CSR250 and so on, and realizes branching of processes, which is required in response to calling/returning of functions, by performing operations of FILO(first-in, last-out).

FIG. 14 is a schematic diagram showing the stack memory 231 in which data is saved from the guaranteed register 225a.

The compression unit 240 is operable, by being controlled by the control unit 223, to compress data retained in the guaranteed register 225a, and saves the data to the stack memory 231.

Figure 15:
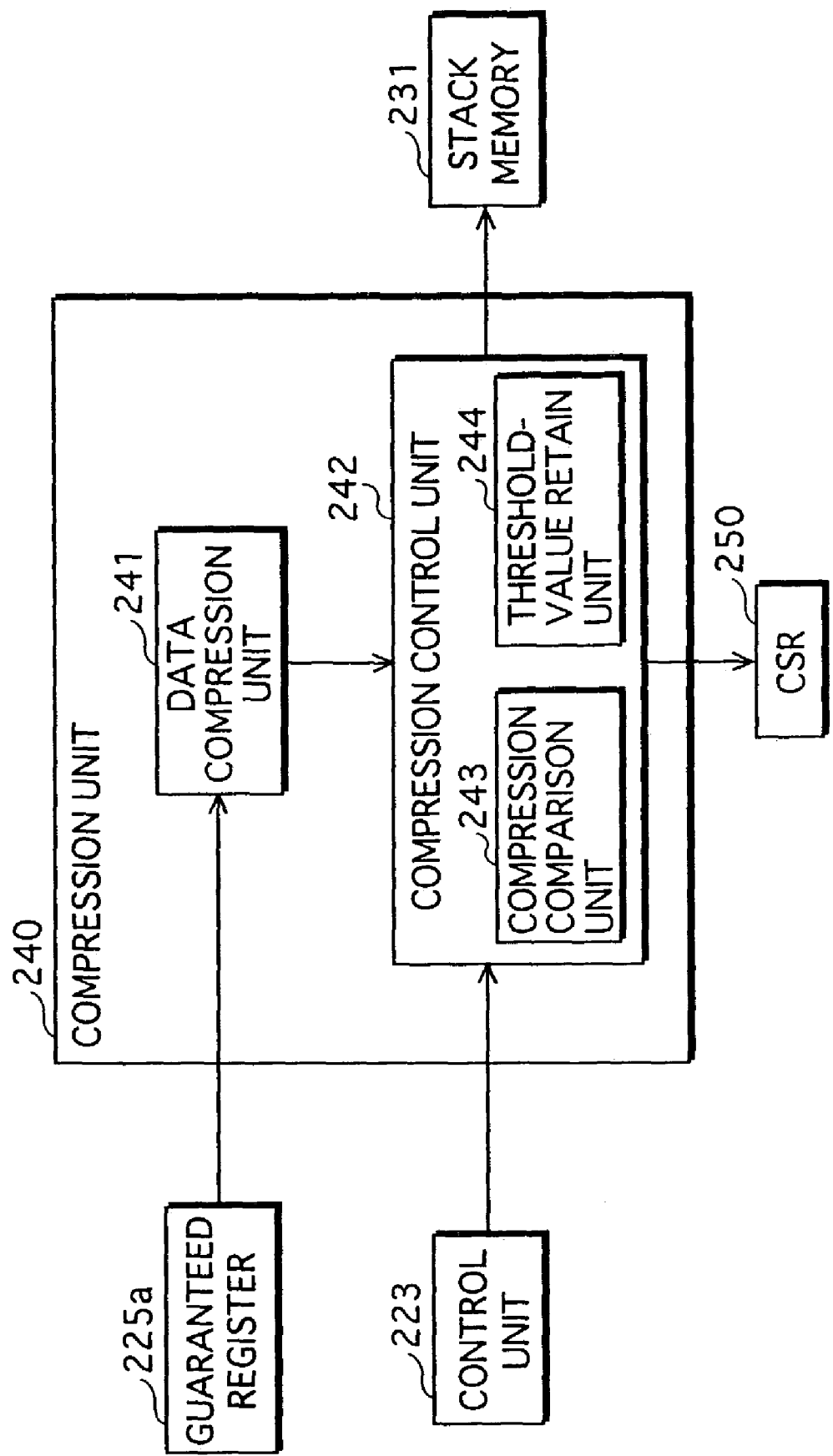
FIG. 15 shows the internal structure of a compression unit 240.

FIG. 15 shows the internal structure of the compression unit 240.

The compression unit 240 includes therein a data compression unit 241 and a compression control unit 242.

The data compression unit 241 is operable to acquire data from the guaranteed register 225a, and to encode the data using Huffman code.

FIG. 16 is a correspondence table used in Huffman code method. The Huffman code method is a data compression method in which, in compressing data, a value that appears often is assigned a code having shorter bit length, and a value that appears rarely is assigned a code having a long bit length.

Figure 17:
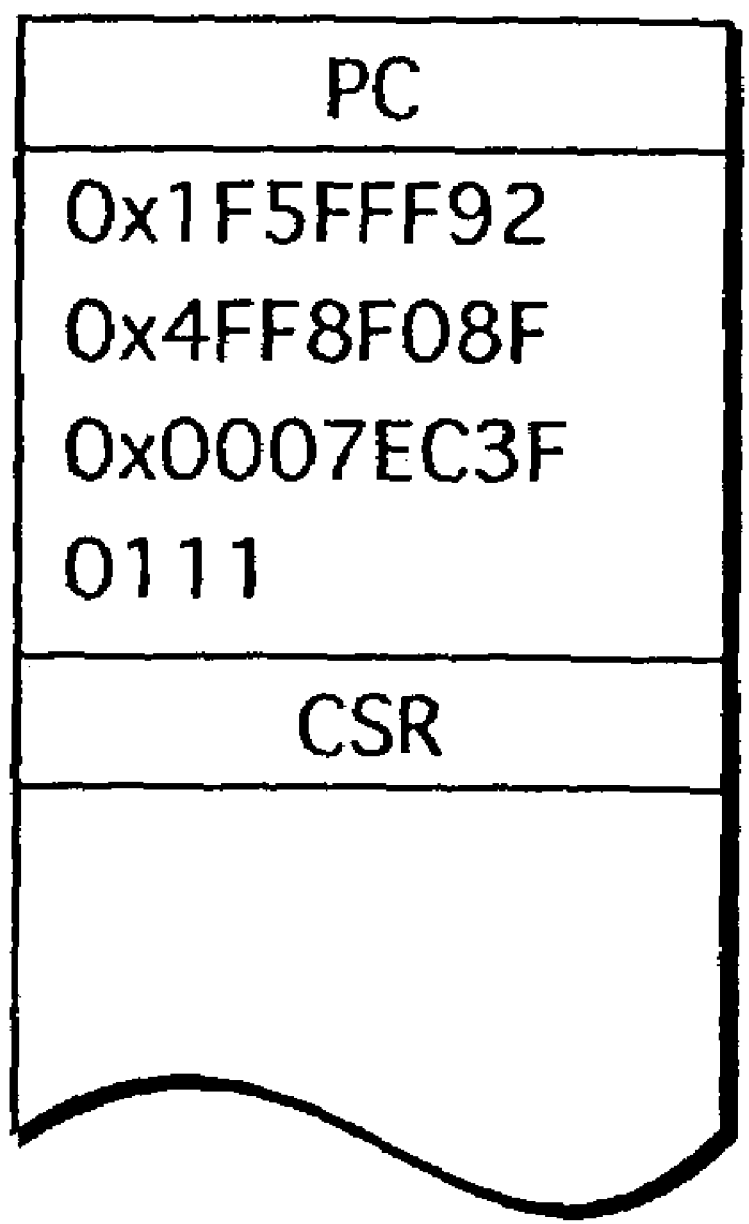
FIG. 17 is a schematic diagram of a stack memory 231 in which the same data as that saved to the stack memory 231 in FIG. 14 is saved therein after being compressed according to the Huffman code table of FIG. 16.

FIG. 17 is a diagram schematically showing a stack memory 231 in which the same data as that saved to the stack memory 231 in FIG. 14 is saved after being compressed according to the Huffman code table of FIG. 16.

The compression control unit 242 shown in FIG. 15 includes therein a compression comparison unit 243 and a threshold-value retain unit 244 The compression comparison unit 243 compares, with the threshold value retained in the threshold-value retain unit 244, a data size of the data that the data compression unit 241 has encoded using Huffman code. After comparison, if the data size of the aforementioned encoded data is smaller than the threshold value, the encoded data is stored, as saved data, in the stack memory 231, and the enable bit of the CSR250 is set to 1, and the data size of the saved data is stored in the CSR. After comparison, if the data size of the encoded data is no smaller than the threshold value, the data of the guaranteed register 225a is stored, as saved data, into the stack memory 231, and the enable bit in the CSR250 is set to 0. Subsequent to the saved data being stored in the stack memory 231, the compression control unit 242 stores the data retained in the CSR250 to the stack memory 231.

Note here that the threshold value retained in the threshold-value retain unit 244 is either a predetermined portion of the data size of the data before being encoded, or a value obtained by subtracting a predetermined value from the data size of the data before being encoded. The threshold value is used to judge compression efficiency of the Huffman code method. In the present embodiment, the threshold value is the same value 256 which coincides with the data size of the guaranteed register 225a.

The CSR250 shown in FIG. 10 is a status register having 32 bits, which is composed of an enable bit of 1 bit, and a data field having 31 bits.

Figure 18:
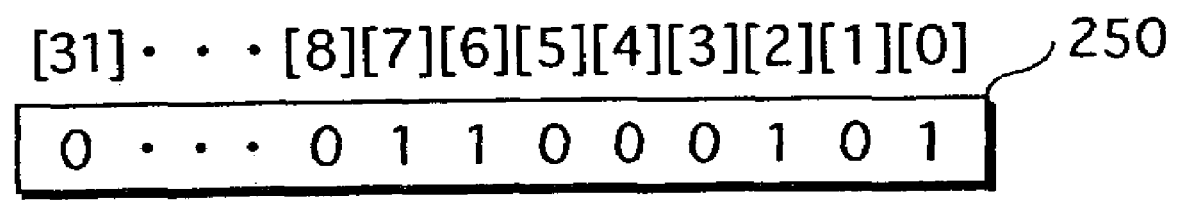

FIG. 18 is a diagram showing bit allocation for the CSR250.

The values on the horizontal axis show the bit position on the CSR. The bit [0] is an enable bit that shows whether the data to be saved to the stack memory 231 is compressed data or not. It is "1" for compressed data, and it is "0" for uncompressed data. The bits [1]-[31] are data fields for storing therein the data sizes of compressed data. If the enable bit is 1, the bits [1]-[31] will store the data size of compressed data, and if it is 0, the bits [1] - [31] will store an undefined value.

The decompression unit 260 is operable to decompress data saved at the stack memory 231 by being controlled by the control unit 223, and to restore the decompressed data to the guaranteed register 225a.

Figure 19:
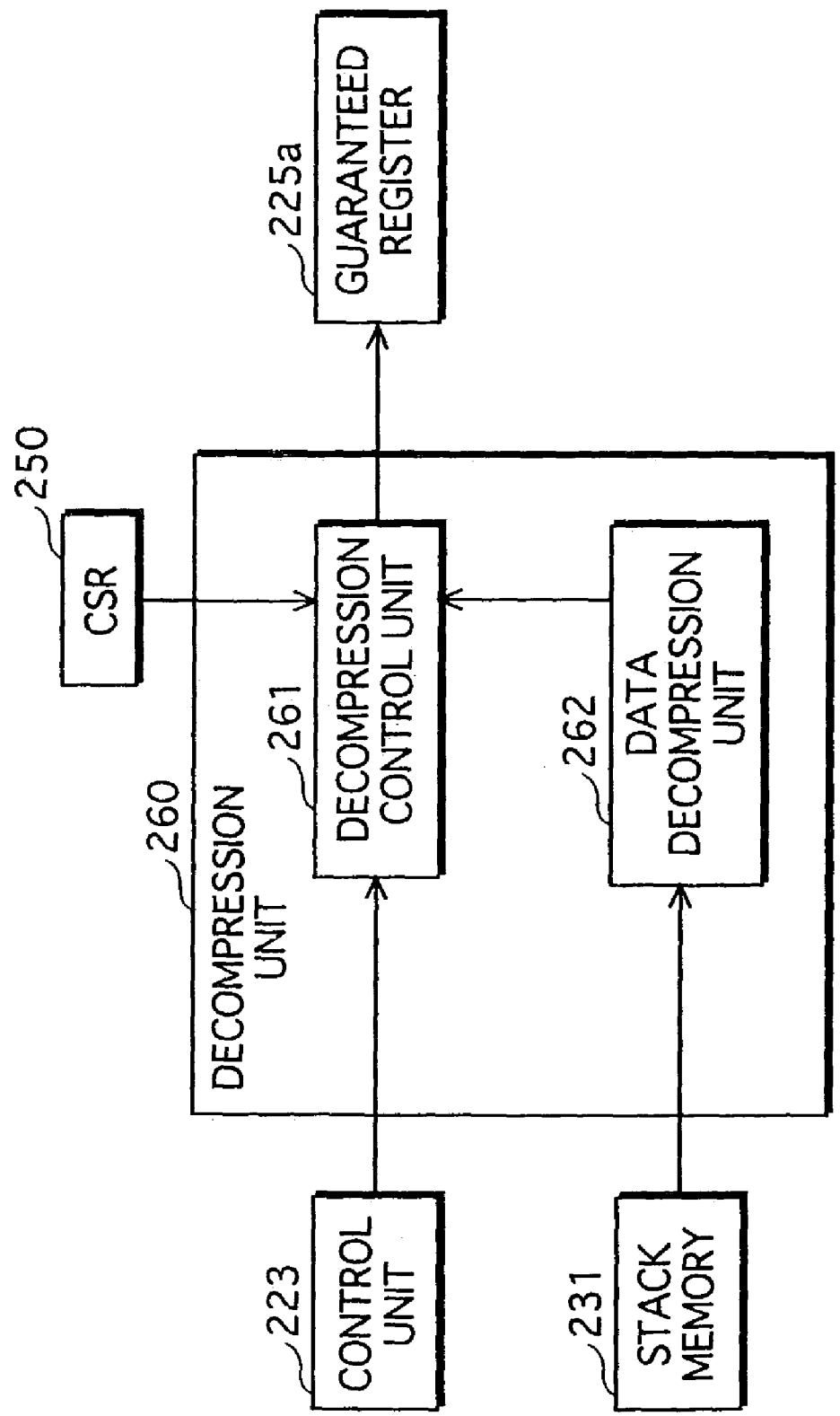
FIG. 19 shows the internal structure of a decompression unit 260.

FIG. 19 shows the internal structure of the decompression unit 260.

The decompression unit 260 includes therein a decompression control unit 261 and a data decompression unit 262.

The decompression control unit 261 reads the data of 32 bits from the stack memory 231, out to the CSR250. If the data's enable bit is 1, the saved data stored in the stack memory 231 is decompressed at the decompression unit 262 and then is stored in the guaranteed register 225a. If the data's enable bit is 0, the saved data in the stack memory 231 is stored to the guaranteed register 225a, as it is.

The data decompression unit 262 performs a reverse conversion of the Huffman code on the data encoded using Huffman code which is stored in the stack memory 231.

Figure 20:
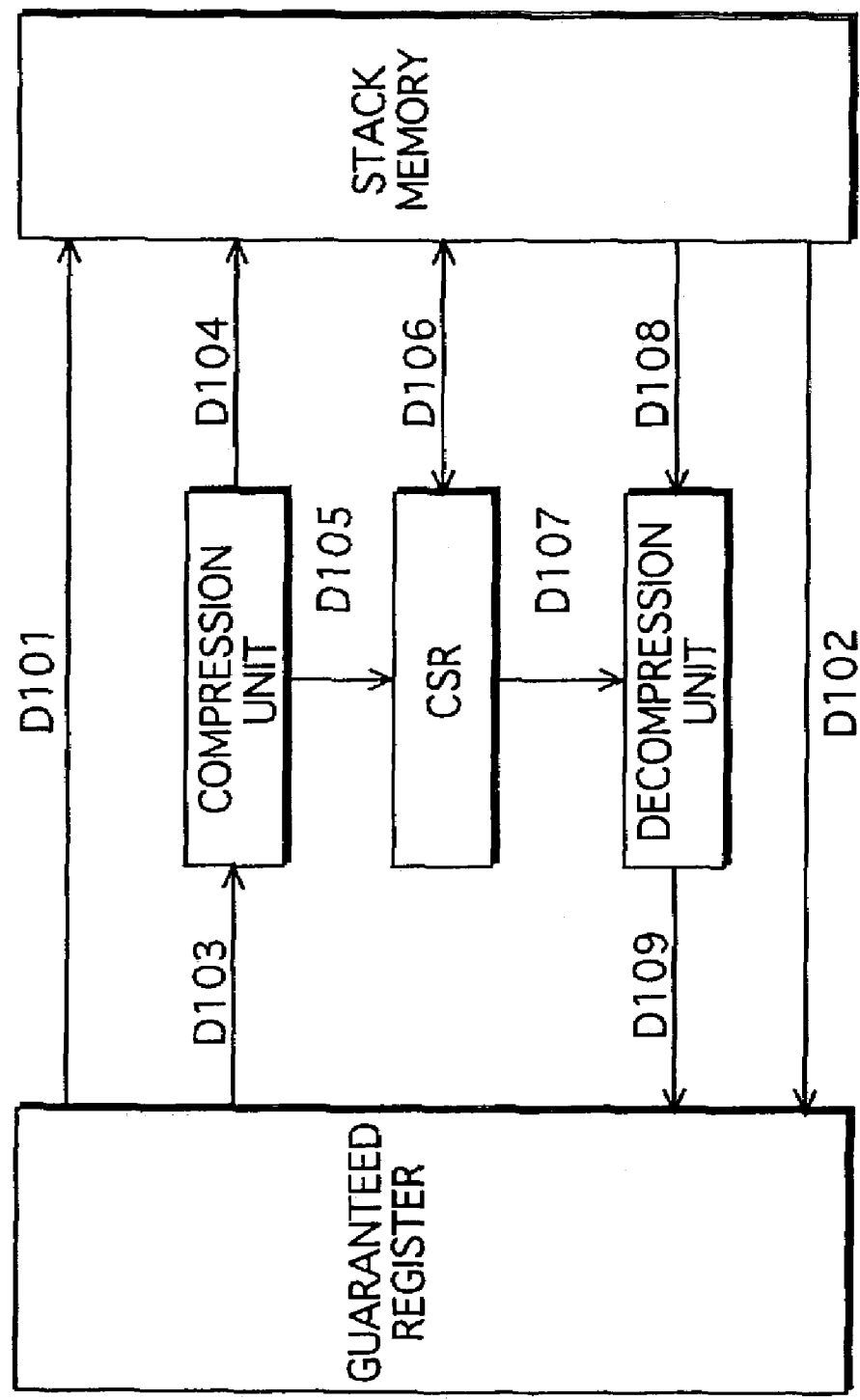
FIG. 20 is a chart showing data flow, in saving/restoring the data performed between the guaranteed register 225a and the stack memory 231.

FIG. 20 is a chart showing data flow, in saving/restoring the data performed between the guaranteed register 225a and the stack memory 231.

When a normal call instruction is performed, the data of the guaranteed register 225a is saved to the stack memory 231 (data flow D101), and when a return instruction is performed, the data is restored from the stack memory 231 to the guaranteed register 225a (data flow D102).

When a call instruction assigned a compression control bit is performed, the data of the guaranteed register 225a is obtained in the compression unit 240 and then compressed (data flow D103). If the data size of the compressed data is larger than the threshold value retained in the threshold-value retain unit 244, the data obtained from the guaranteed register 225a is stored in the stack memory 231 as it is, as saved data, If the data size thereof is smaller than the threshold value, the compressed data is stored in the stack memory 231 as saved data (data flow D104). During this operation, information on whether compression is performed and size of the compressed data are set in the CSR250 (data flow D105), then the data retained in the CSR250 is stored in the stack memory 231 (data flow D106).

When a return instruction assigned a decompression control bit is performed, the data is restored from the stack memory 231 to the CSR250 (data flow D106), and information on whether the saved data in the stack memory is compressed or not and the data size of the saved data are acquired from the data restored to the CSR250, into the decompression unit 260 (data flow D107). The saved data having the data size shown by the data of the CSR250 is obtained in the decompression unit 260 from the stack memory 231 (data flow D108). Here, if the saved data is compressed data, the data size thereof is the one stored in the data field in the CSR250, and if it is not compressed, the data size is 256 bits. If the saved data is compressed data, it will be restored to the guaranteed register 225a after decompressed by the decompression unit 260 into 256 bits; and if it is not compressed data, the saved data having 256 bits in size will be restored to the guaranteed register 225a as it is (data flow D109).

Note here that in this embodiment, Huffman code method is used as an algorithm for converting the saved data. However, other compression algorithms such as the run-length method can be employed in converting the saved data, as long as the methods are reversible encoding methods.

<Operation>

(Program Conversion Apparatus)

In the following, operation performed by the program, conversion apparatus 100 having the aforementioned structure will be detailed.

Figure 21:
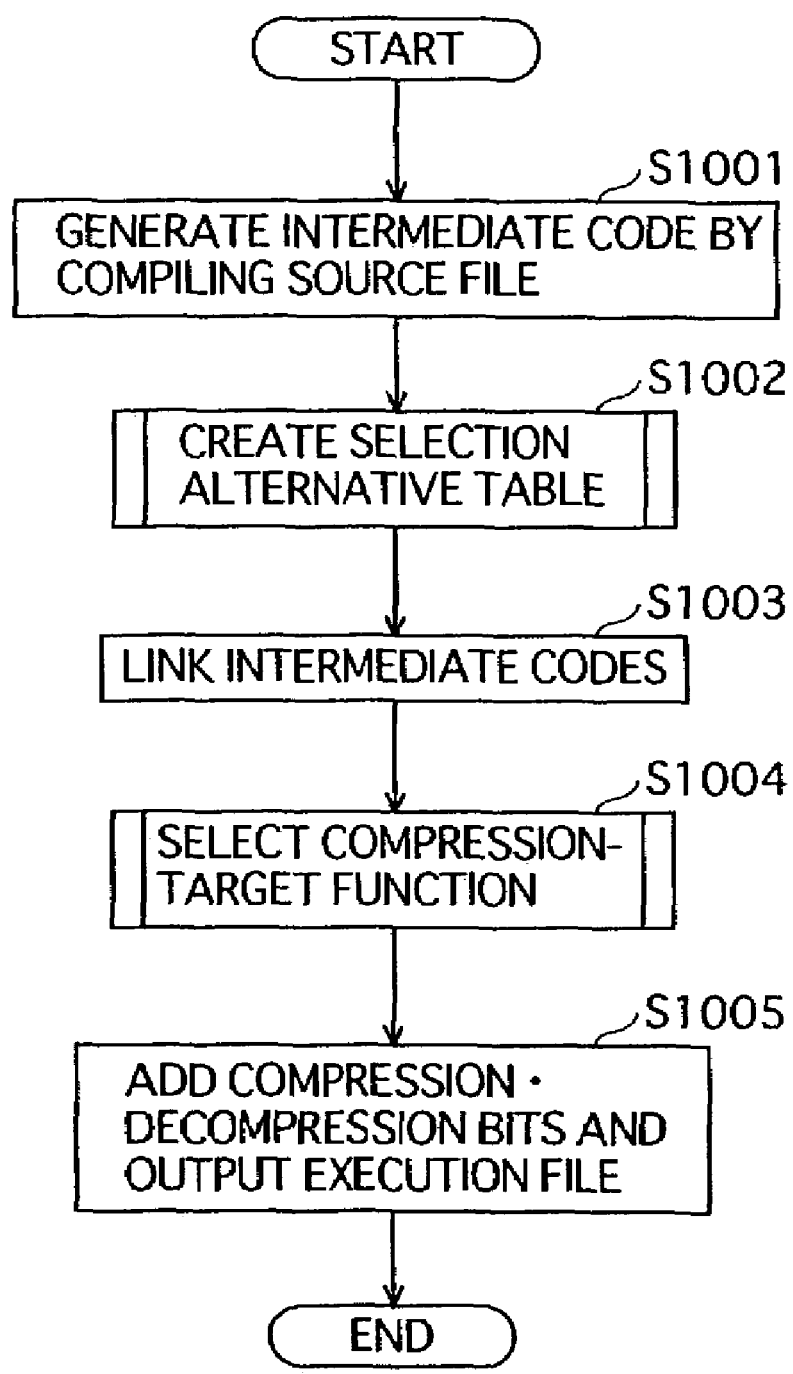
FIG. 21 is a chart showing the flow of the operations of the program conversion apparatus 100.

FIG. 21 is a chatt showing the flow of the operations of the program conversion apparatus 100.

First, the source file acquisition unit 110 acquires the source file group 10, and the translation unit 131 converts the source file group 10 into an intermediate code group in machine language (S1001). The judgment unit 120 creates, from the aforementioned source file group 10, a selection alternative table 123a (S1002).

Following this, the link unit 133 generates an executable machine language code by linking intermediate codes in the intermediate code group (S1003), and the judgment unit 120 selects a compression-target function, from the intermediate code group (S1004). Finally, the compression-decompression bit addition unit 134 adds a compression control bit to the call instruction of each compression-target function which is included in the aforementioned machine language code, and adds a decompression control bit to the return instruction of each compression-target function, and outputs them to the storage unit 140 (S1005).

The execution file 20 is generated by the aforementioned operations.

Next, the operation (S1002) is detailed with reference to the corresponding drawing. This operation is performed by the program conversion apparatus 100 and is for creating a selection alternative table.

Figure 22:
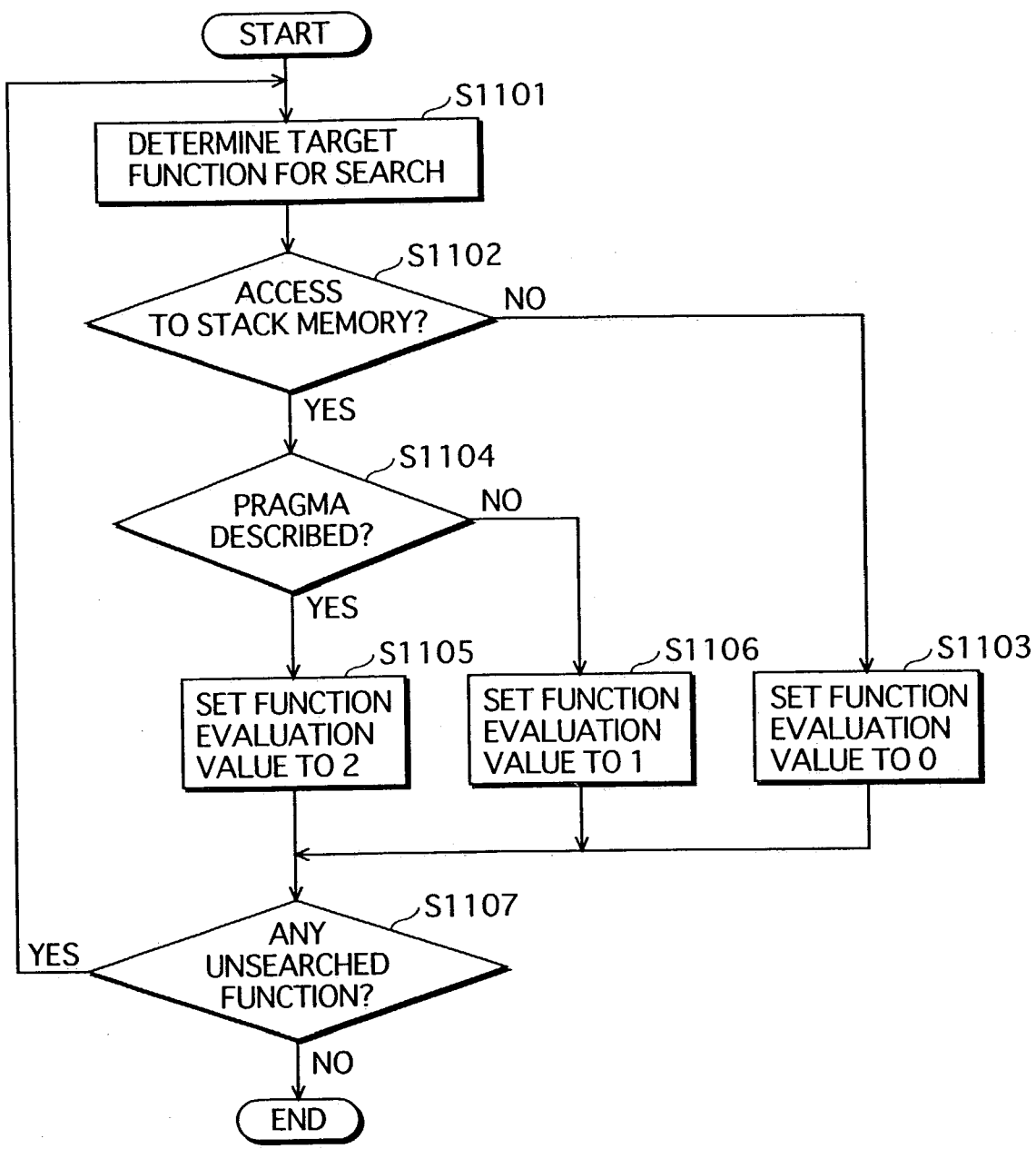

FIG. 22 is a flow chart showing how to create a selection alternative table 123a.

First, the stack access detection unit 113 sets, to be a target function for search, any of the unsearched functions within the functions described in the source file group 10, and starts conducting a search (S1101). The stack access detection unit 113 judges whether there is, in the function to be searched, an access to a stack memory of an address which is higher order than the address shown by the stack pointer of a process initiation of the target function (S1102). The stack access detection unit 113, when it is judged that there is an access within the target function (S1102:Yes), sets the function evaluation value of the target function to be 0, and writes, in the selection alternative table 123a, the function name 123b and the function evaluation value 123c of the target function (S1103).

On the other hand, when the stack access detection unit 113 judges that there is no access within the target function to be searched (S1102:No), the user-specified function extraction unit 122 judges whether the pragma #STACK_COMPRESS is described within the target function (S1104). If the pragma #STACK_COMPRESS is described within the target function (S1104:Yes), the user-specified function extraction unit 122 sets the function evaluation value of the target function to be 2, and write, in the selection alternative table 123a, the function name 123b and the function evaluation value 123c of the target function (S1105). If the pragma #STACK_COMPRESS is not described in the target function (S1104:No), the user-specified function extraction unit 122 sets the function evaluation value of the target function to be 1, and writes, in the selection alternative table 123a, the function name 123b and the function evaluation value 123c of the target function (S1106).

After the aforementioned operations have been done and as a result the target function has been written in the selection alternative table 123a, if there is other unsearched functions (S1107:Yes), the stack access detection unit 113 repeats the aforementioned operations for the unsearched functions as new target functions. If there is no other unsearched functions (S1107:No), the creation of the selection alternative table ends here.

Next, the operation (S1104) is detailed with reference to the corresponding drawing. This operation is performed by the program conversion apparatus 100 and is for selecting a compression-target function.

Figure 23:
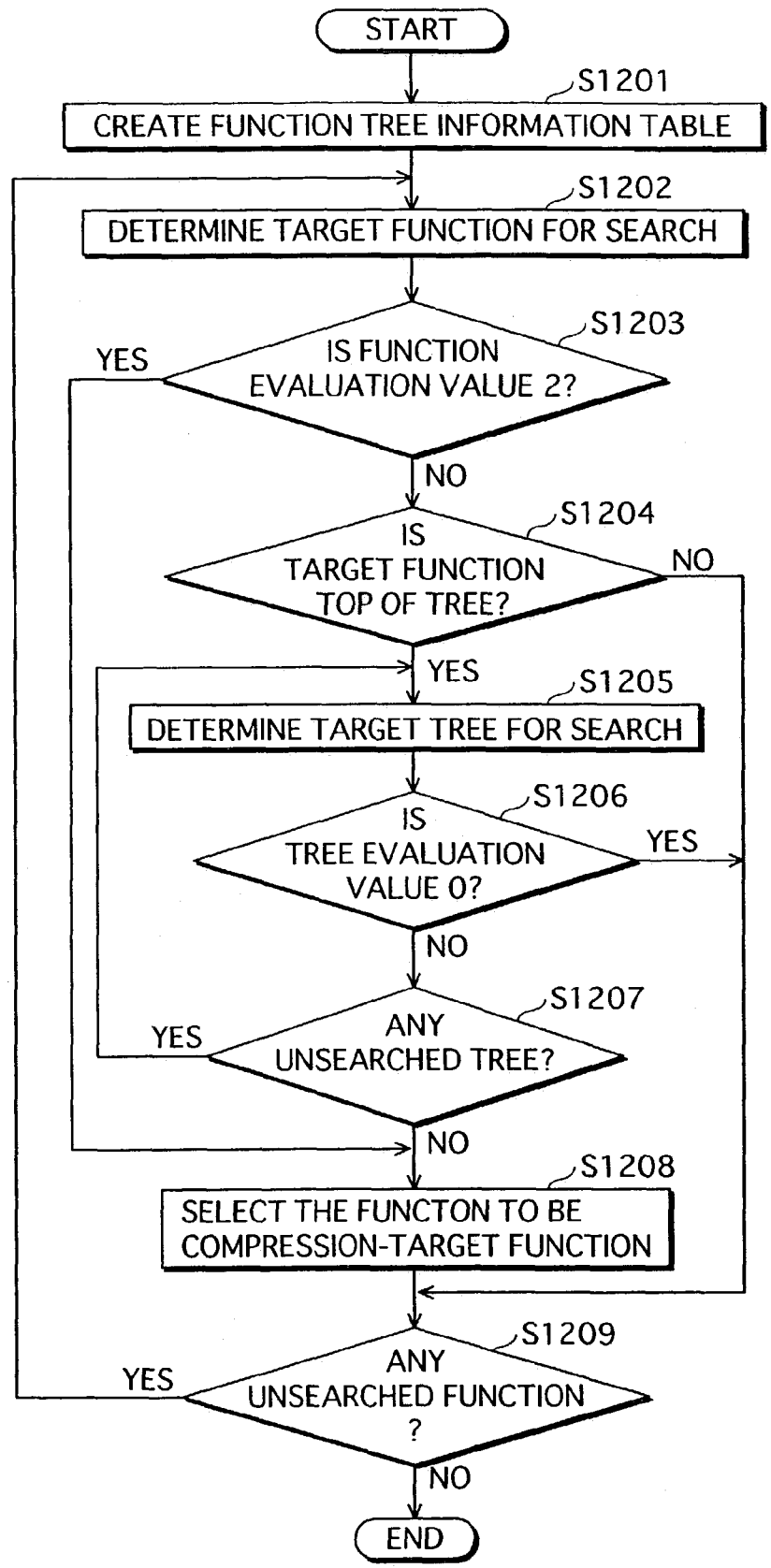
FIG. 23 is a flow chart showing how to select a compression-target function.

FIG. 23 is a flow chart showing how to select a compression-target function.

First, the function tree information creation unit 124 creates a function tree information table 125a using the intermediate code group retained in the intermediate code retain unit 132 (S1201).

Next, the function selection unit 126 sets, to be a target function for search, any of unsearched functions within the functions registered in the selection alternative table 123a, and starts conducting a search (S1202). The function selection unit 126 judges whether the function evaluation value 123c of the target function is set to be 2 (S1203). If the function evaluation value 123c of the target function is set to be 2 (S1203:Yes), the function selection unit 126 selects the target function to be a compression-target function (S1208). On the contrary, if the function evaluation value 123c of the target function is not set to be 2 (S1203:No), the function selection unit 126 judges, within the function tree information table 125a, whether there is information on a branch in which the target function is the highest order function (S1204).

If there is no information on a branch in which the target function is the highest order function (S1204:No), then the function selection unit 126 determines not to select the target function to be a compression-target function.

If there is information on a branch in which the target function is the highest order function (S1124: Yes), the function selection unit 126 sets the branch information to be target branch information to be searched (S1205), and judges whether the tree evaluation value 125c of the target branch information is set to be 0 (S1206).

If the tree evaluation value 125c of the target branch information is set to be 0 (S1206:Yes), the function selection unit 126 determines not to select the target function to be a compression-target function.

If the tree evaluation value 125c of the target branch information is not set to be 0 (S1206:No) the function selection unit 126 judges whether, within the function tree information table 125a, there is any unsearched information on a branch in which the target function is the highest order function (S1207). If there is any further unsearched branch information (S1207:Yes), the operations are performed from S1205 for the unsearched branch information. If there is not any unsearched branch information in which the target function is the highest order function (S1207:No), the function selection unit 126 selects the target function to be a compression-target function, and notifies the compression-decompression bit addition unit 134 of the function (S1208).

By the aforementioned operations, determination is performed about whether the target function should be selected as a compression-target function. Then, if the selection alternative table 123a has further unsearched functions (S1209: Yes), the function selection unit 126 repeats the search for the unsearched functions. If there is not any unsearched function (S1209:No), the operation for selecting compression-target functions ends.

By the aforementioned operations, the program conversion apparatus 100 is able to select, as compression-target functions, the highest order functions of the branches of the tree structure that do not include any functions that are required to refer to the used area of the stack memory, and the functions that are specified by a user. The program conversion apparatus 100 is further able to create an execution file 20 in which a compression control bit is added to every call instruction for calling a compression-target function having been determined as in the above, and in which a decompression control bit is added to every return instruction for terminating the call of a compression-target function having been determined as in the above.

(Information Processing Apparatus)

In the following, the operations of the information processing apparatus 200 that has the aforementioned structure is described.

The information processing apparatus 200 performs a parallel execution of a plurality of machine language instructions, by adopting pipeline process by which a machine language instruction is divided into a plurality of stages. However, the description uses an example in which one machine language instruction corresponds to one stage, so that the present invention is easy to understand.

Figure 24:
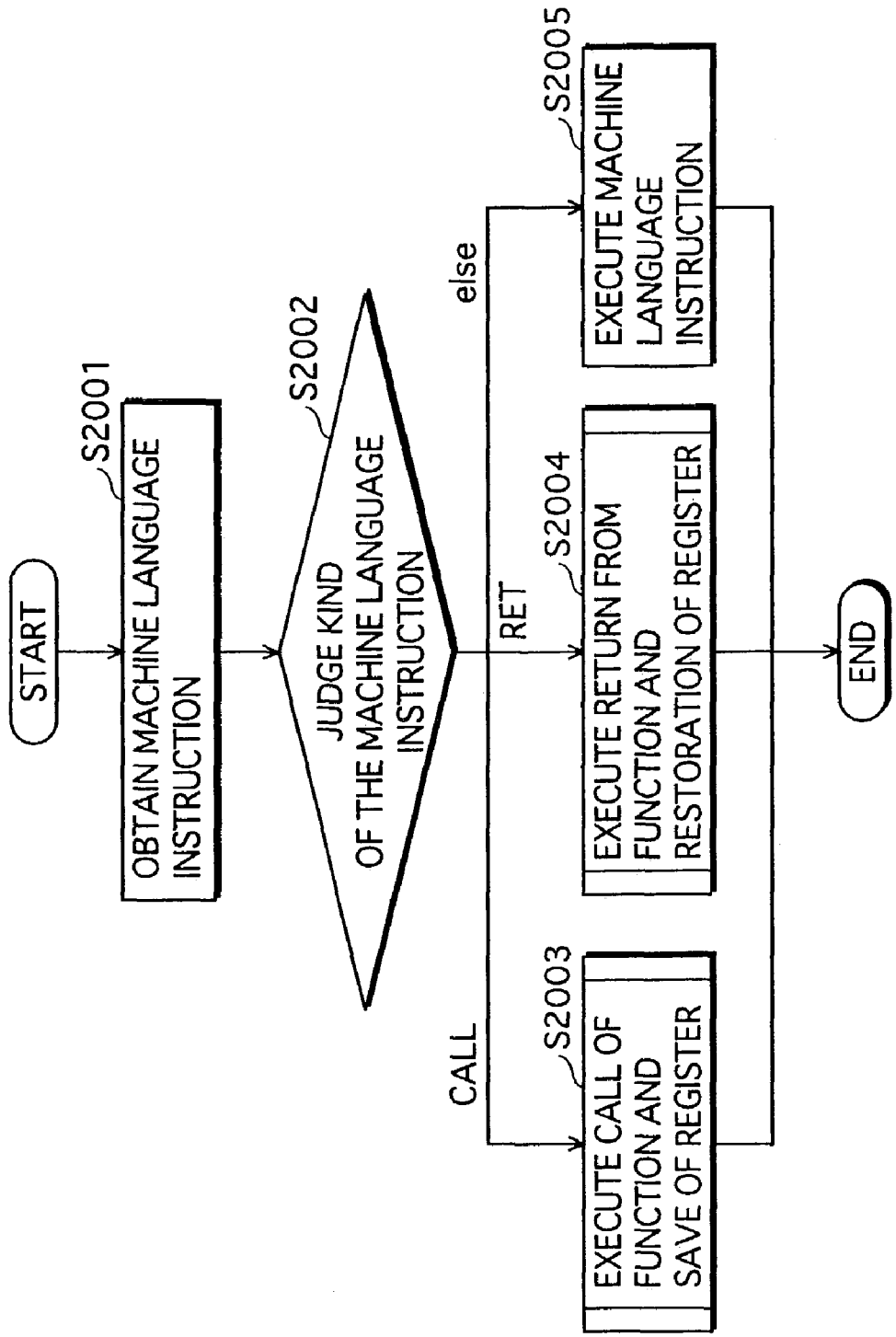
FIG. 24 is a chart showing the flow of the operations performed by the information processing apparatus 200.

FIG. 24 is a chart showing the flow of the operations performed by the information processing apparatus 200.

First, the IF 221 fetches a machine language instruction from the address on the instruction memory 210 which is shown by the PC226 (S2001). Next, the DEC222 determines the kind of the machine language instruction (S2002).

If the DEC222 determines that the machine language instruction is a call instruction (S2002:CALL), a function is called and a guaranteed register 225a is accordingly saved (S2003).

If the DEC222 determines that the machine language instruction is a return instruction (S2002:RET), the function is terminated and the guaranteed register 225a is accordingly restored (S2004).

If the DEC222 determines that the machine language instruction is other kinds than a call instruction and a return instruction (S2002 else), then the execution unit 224 executes the machine language instruction (S2005).

By the aforementioned operations, process for one machine language instruction is completed.

Next, the operation S2003, in which the information processing apparatus 200 calls a function, and accordingly, a guaranteed register 225a is saved, is detailed with reference to the corresponding drawing.

Figure 25:
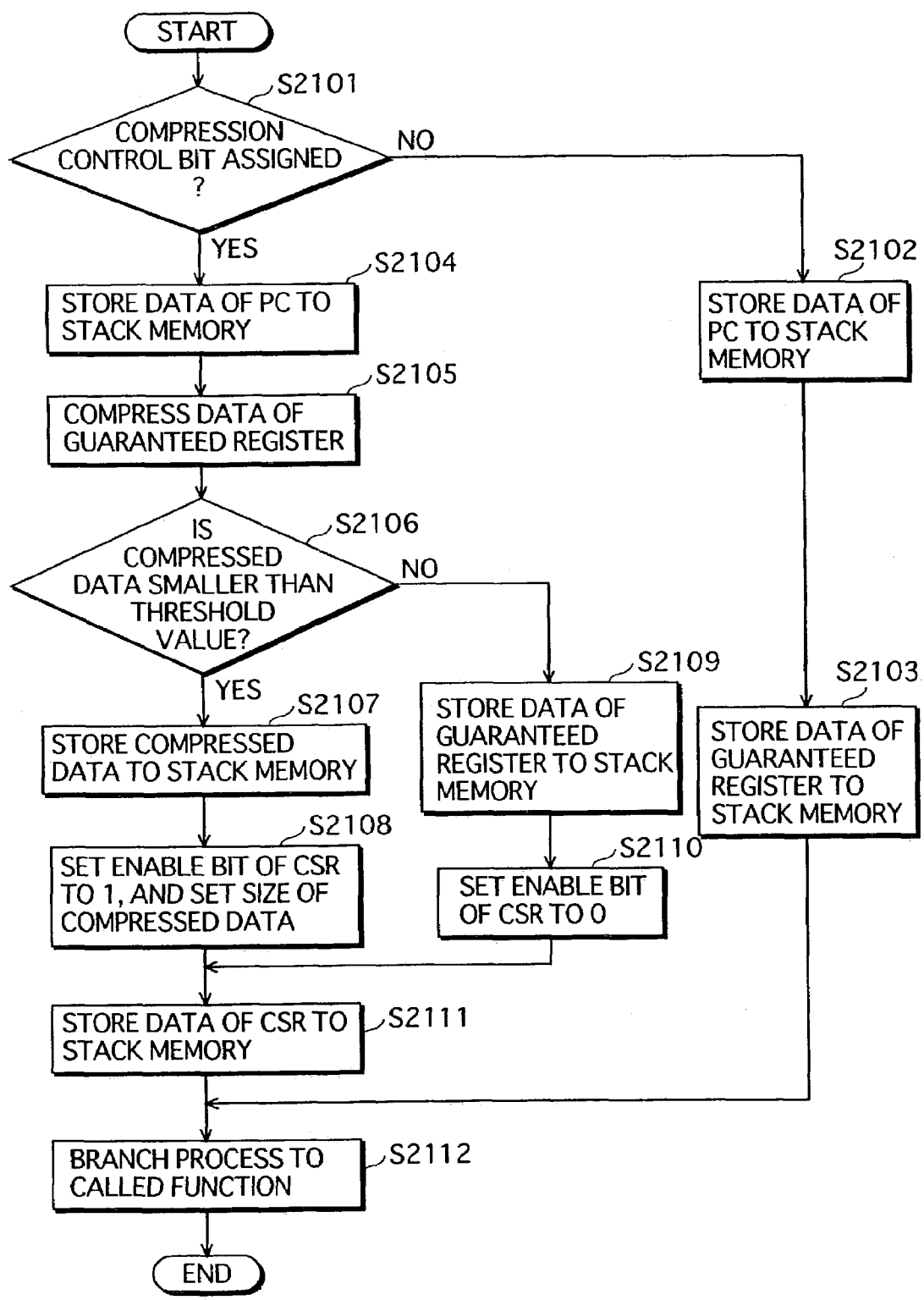
FIG. 25 is a chart showing the flow of the operations of calling a function and saving of the guaranteed register 225a that follows.

FIG. 25 is a chart showing the flow of the operations of calling a function and the following saving of the guaranteed register 225a.

First, the DEC222 judges whether a compression control bit is added to a call instruction (S2101). If the DEC222 judges that no compression control bit is added to the call instruction (S2101:No), the control unit 223 stores the data of the PC226 to the stack memory 231 (S2102). Then, the control unit 223 stores the data having 256 bits that is in the guaranteed register 225a to the stack memory 231 (S2103).

On the other hand, if the DEC222 judges that a compression control bit is added to the call instruction (S2101:Yes), the control unit 223 stores the data of the PC226 to the stack memory 231 (S2104). Then, the compression control unit 242 acquires the data retained in the guaranteed register 225a. The data compression unit 241 encodes the acquired data using Huffman code (S2105), and the compression comparison unit 243 judges whether the Huffman-coded data is smaller in size than the threshold value (S2106). If the compression comparison unit 243 judges that the Huffman-coded data is smaller than the threshold value (S2106:Yes), the compression control unit 242 stores the Huffman-coded data to the stack memory 231 (S2107) Then, the compression control unit 242 sets the enable bit of the CSR250 to be 1, and sets the size of the Huffman-coded data in the data field (S2108).

When the compression comparison unit 243 judges that the size of the Huffman-coded data is no smaller than the threshold value (S2106: No), the compression control unit 242 stores the data having 256 bits that has been acquired from the guaranteed register 225a, to the stack memory 231 as it is (S2109). The compression control unit 242 then sets the enable bit of the CSR250 to be 0 (S2110).

After the CSR250 is set, the compression control unit 242 stores the data retained in the CSR250 to the stack memory 231 (S2111).

Finally, the control unit 223 branches process to the calling function (S2112).

Next, the operation S2004, in which the information processing apparatus 200 terminates a function, and accordingly, the guaranteed register 225a is restored, is detailed with reference to the corresponding drawing.

Figure 26:
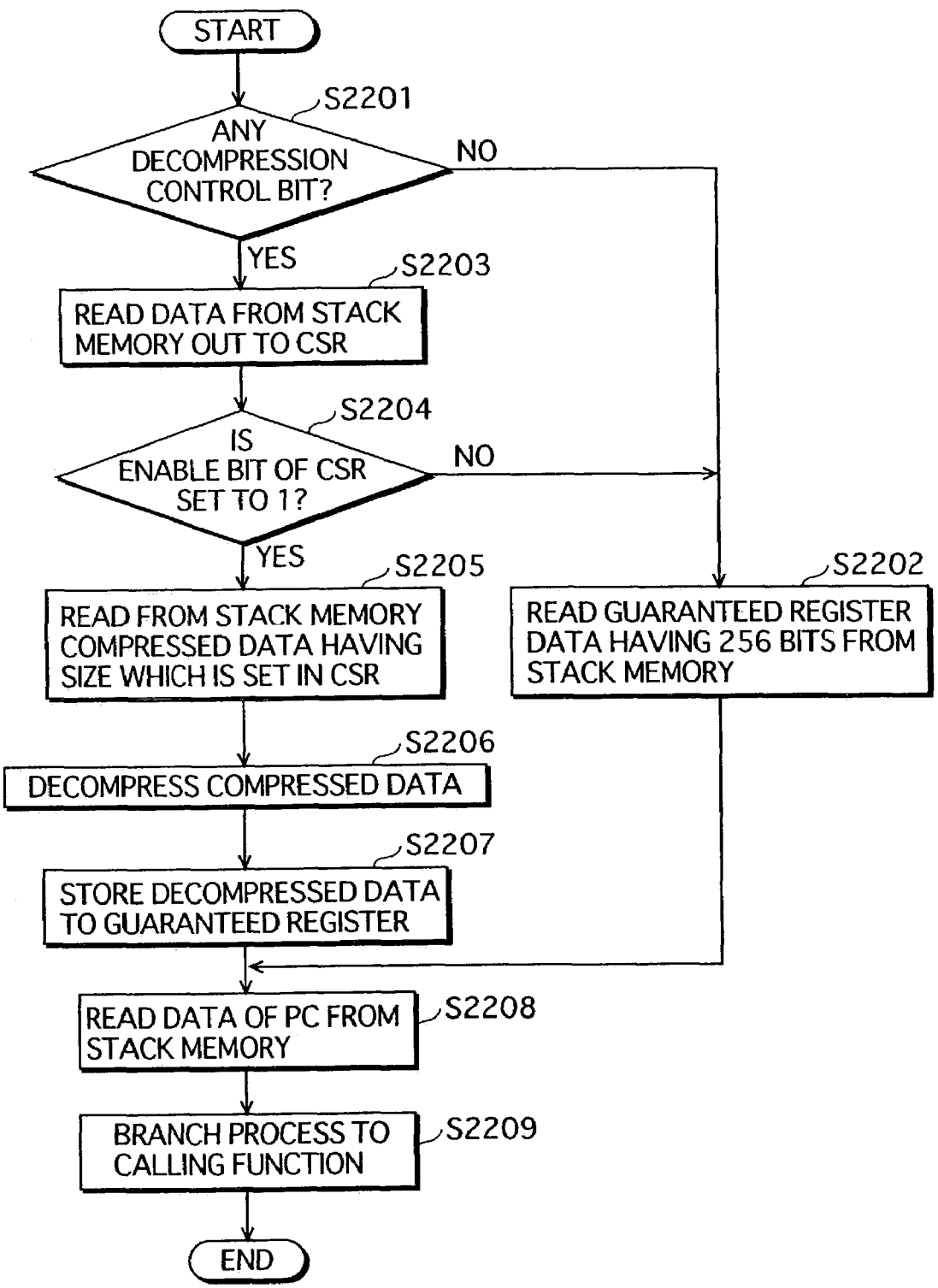

FIG. 26 is a chart showing the flow of the operations of terminating a function and the following restoration of the guaranteed register 225a.

First, the DEC222 judges whether a decompression control bit is added to a return instruction (S2201). If the DEC222 judges that the return instruction is not assigned a decompression control bit, (S2201:No), the control unit 223 reads the saved data having 256 bits out to the guaranteed register 225a (S2202).

On the other hand, if the DEC222 judges that the return instruction is assigned a decompression bit (S2201:Yes), the decompression control unit 261 reads the data of the stack memory 231 out to the CSR250 (S2203). The decompression control unit 261 then judges whether the enable bit of the CSR250 having been read is 1 (S2204). If the decompression control unit 261 judges that the enable bit of the read CSR250 is not 1 (S2204:No), the decompression control unit 261 reads the saved data having 256 bits from the stack memory 231, out to the guaranteed register 225a, as it is (S2202).

If the decompression control unit 261 judges that the enable bit of the read CSR250 is 1 (S2204: Yes), the decompression control unit 261 reads, from the stack memory 231, the data having a size shown in the data field of the CSR250 (S2205). Then the data decompression unit 262 performs a reverse-conversion of Huffman code on the read data, so as to decompress the data (S2206), and the decompression control unit 261 restores the data decompressed into 256 bits (S2207).

By the aforementioned operations, the data is restored to the guaranteed register 225a. Then, the control unit 223 reads data from the stack memory 231 out to the PC226 (S2208), and finally, process is branched to the calling function and that is shown by the PC226 (S2209).

By the aforementioned operations, the information processing apparatus 200 is able to compress data that is required to be saved from the guaranteed register when a function is called, thereby reducing the amount of data to be stored in the stack memory 231. Furthermore, the information processing apparatus 200 is able to decompress data that is required to be restored from the stack memory 231 when a function is terminated, thereby guaranteeing data retained in the guaranteed register 225a before and after the call of a function.

<Summary>

The present invention enables to compress data that is required to be saved to the stack memory when a function is called, so as to enhance the usage efficiency of the stack memory. Accordingly, the stack memory will have less possibility of overflow, and so memory-saving is realized.

Furthermore, according to the embodiment of the present invention, selective compression of data is realized, by which functions are selected whose related data is required to be compressed before being saved to the stack memory when the functions are called. The aforementioned selected functions are either functions that are to be stored in the stack memory for a long time, such as functions having the highest order of each branch in the tree structure, or functions explicitly specified by a user. According to this, increase in number of cycles due to compression operations is restrained, and usage efficiency of the stack memory will be improved.

Note here that in the present embodiment, functions that have the highest order of each branch of the tree structure are selected to be compression-target functions. However, this is only one example of selecting functions to be stored in the stack memory for a long time to be compression-target functions based on the hierarchical structure of functions, and needless to say, the present invention is not limited to this embodiment.

For example, it may also be arranged to select the top M functions of each branch in a tree structure, to be compression-target functions (M being a natural number). Alternatively, all functions higher than the Nth lowest order function (N being a natural number) may be selected to be compression-target functions. Or, functions may be selected that are included in a branch that has a predetermined number of functions or more.

In addition, according to the embodiment of the present invention, if there is a stack access function for referring to the stack memory in any of the branches of the tree structure, functions included in the particular branch will not be selected as compression-target functions. According to this, when such stack access function refers to the stack memory, it will not happen such that data to be referred to has been compressed, or that address referred to is not the intended address.

<Other Modification Examples>

So far, the present invention has been described based on the aforementioned embodiment. However needless to say, the present invention is not limited to the aforementioned embodiment, and includes the following cases, for example.

(1) The present invention may be methods shown in the above. Further, the methods may be a computer program which is executed by a computer, or may be a digital signal composed of the computer program.

Furthermore, the present invention may be a computer-readable recording medium on which the aforementioned computer program or the digital signal is recorded, such as a flexible disc, a hard disc, a CD-ROM, an MO, a DVD, a DVD-ROM, a DVD-RAM, a BD(Blu-ray Disc), and a semiconductor memory. The present invention may further be the computer program or the digital signal that are recorded on any one of these recording media.

Further, the present invention may be structured so that the aforementioned computer program or the digital signal is transmitted through a network represented by a telecommunication line, radio/wire communication lines, and the Internet, and the like.

Further, the present invention may be a computer system including a microprocessor and a memory, where the memory records thereon the aforementioned computer program, and the microprocessor operates in accordance with the computer program.

Still further, the aforementioned program or the digital signal may be executed by another independent computer system, by being sent in any of the mentioned recording media, or by being transmitted through the aforementioned networks, and the like.

(2) The described embodiment has a structure of being equipped with dedicated hardware for encoding data using Huffman code. However, the present invention may also be structured that the processor will encode the data retained in the register using Huffman code.

(3) It is also possible to combine any of the embodiment and the modification examples.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An information processing apparatus including a processor that has at least one register and performs processing according to a machine language program, the register retaining data used in computation, the information processing apparatus comprising:
   a compression judgment unit operable to judge whether the machine language program has information indicating that the data retained in the register should be compressed and then saved to a stack memory in response to call of a predetermined function; and
   a save unit operable to perform a data saving, which is to save the data retained in the register to the stack memory, wherein when the judgment by the compression judgment unit is affirmative and the data saving is performed in response to the call of the predetermined function, the save unit compresses the data before the data saving, when the judgment by the compression judgment unit is affirmative and the data saving is performed in response to call of a function that is other than the predetermined function, the save unit performs the data saving without compressing the data, and when the judgment by the compression judgment unit is not affirmative, the save unit performs the data saving without compressing the data, whether the data saving is performed in response to the call of the predetermined function, or in response to the call of the function that is other than the predetermined function.

2. The information processing apparatus of claim 1, further comprising:

a decompression judgment unit operable to judge whether or not there is decompression information indicating that the data saved in the stack memory should be decompressed and then restored to the register in response to termination of the call of the predetermined function; and a restore unit operable to perform a data restoring, which is to restore the data saved in the stack memory to the register, wherein when the judgment by the decompression judgment unit is affirmative and the data restoring is performed in response to the termination of the call of the predetermined function, the restore unit decompresses the data before the data restoring, and when the judgment by the decompression judgment unit is affirmative and the data restoring is performed in response to termination of the call of the function that is other than the predetermined function the restore unit performs the data restoring without decompressing the data, and when the judgment by the decompression judgment unit is not affirmative, the restore unit performs the data restoring without decompressing the data, whether the data restoring is performed in response to the termination of the call of the predetermined function, or in response to the termination of the call of the function that is other than the predetermined function.

3. The information processing apparatus of claim 2, wherein the decompression judgment unit judges whether the machine language program has the decompression information.

4. The information processing apparatus of claim 3, wherein the save unit performs the data saving in response to the call of the predetermined function when a call instruction for calling the predetermined function is executed, and the restore unit performs the data restoring in response to the termination of the call of the predetermined function when a return instruction for terminating the call of the predetermined function is executed.

5. The information processing apparatus of claim 3, wherein, the save unit performs the data saving in response to the call of the predetermined function when a process for the predetermined function starts, and the restore unit performs the data restoring in response to the termination of the call of the predetermined function when the process for the predetermined function finishes.

6. The information processing apparatus of claim 2, wherein the save unit, when compressing and saving the data retained in the register to the stack memory, associates the decompression information with compressed data resulting from compressing the data retained in the register, and saves the decompression information and the compressed data in association to the stack memory, the decompression judgment unit judges whether the stack memory has decompression information that is associated with data saved in the stack memory, and the restore unit, when the judgment by the decompression judgment unit is affirmative, decompresses and then restores to the register the data associated with the decompression information in response to termination of the call of the predetermined function.

7. The information processing apparatus of claim 6, wherein the save unit comprises:

a data conversion subunit operable to convert first data retained in the register into second data according to a predetermined algorithm;

a comparison subunit operable to compare the data size of the second data with a threshold value that shows compression efficiency; and a selective save subunit operable to, when the data size of the second data is smaller than the threshold value, save the second data to the stack memory, and when the data size of the second data is greater than the threshold value, save the first data to the stack memory.

8. The information processing apparatus of claim 6, wherein the save unit performs the data saving in response to the call of the predetermined function when a call instruction for calling the predetermined function is executed, and the restore unit performs the data restoring in response to the termination of the call of the predetermined function when a return instruction for terminating the call of the predetermined function is executed.

9. The information processing apparatus of claim 6, wherein the save unit performs the data saving in response to the call of the predetermined function when a process for the predetermined function starts, and the restore unit performs the data restoring in response to the termination of the call of the predetermined function when the process for the predetermined function finishes.

10. An information processing method used with an information processing apparatus including a processor that has at least one register and performs processing according to a machine language program, the register retaining data used in computation, the information processing method comprising:

a compression judgment step of judging whether the machine language program has information indicating that the data retained in the register should be compressed and then saved to a stack memory in response to call of a predetermined function; and a save step of performing a data saving, which is to save the data retained in the register to the stack memory, wherein when the judgment by the compression judgment step is affirmative and the data saving is performed in response to the call of the predetermined function, the save step compresses the data before the data saving, when the judgment by the compression judgment step is affirmative and the data saving is performed in response to call of a function that is other than the predetermined function, the save step performs the data saving without compressing the data, and when the judgment by the compression judgment step is not affirmative, the save step performs the data saving without compressing the data, whether the data saving is performed in response to the call of the predetermined function, or in response to the call of the function that is other than the predetermined function.

11. A program conversion apparatus comprising:

an acquisition unit operable to acquire an input program that includes one or more functions;

a judgment unit operable to, when (i) data that is retained in a register included in a processor is saved to a stack memory in response to call of a function and (ii) the function called is a predetermined function, judge, from the input program, whether the data should be saved after being compressed or without being compressed ; and a conversion unit operable to, (i) when the judgment unit has judged that the data should be saved after being compressed, convert the input program into an output program that includes indication information, and (ii) when the judgment unit has judged that the data should be saved without being compressed, convert the input program into an output program that does not include the indication information, wherein when the data is saved in response to the call of the predetermined function, the indication information indicates, to the processor, that the data retained in the register should be compressed and then saved to the stack memory.

12. The program conversion apparatus of claim 11, wherein the judgment unit includes:

a detection subunit operable to detect a stack access function in the input program, the stack access function referring to the stack memory in which the data in the register have been saved, and the judgment unit judges that the data retained in the register should be saved to the stack memory without being compressed in response to call of any of the stack access function and functions that position higher order than the stack access function in a hierarchical structure of functions included in the input program.

13. The program conversion apparatus of claim 11, wherein the judgment unit includes:

a pre-specification detection subunit operable to detect a pry-specified function in the input program, the pre-specified function being a function to which information indicating that the data retained in the register should be compressed and then saved to the stack memory has been added in advance, and the judgment unit judges that the data retained in the register should be compressed and then saved to the stack memory in response to call of the pre-specified function. The program conversion apparatus of claim 11, wherein the judgment unit includes:

a nest information creation subunit operable to create nest information that shows a hierarchical structure of functions included in the input program, and when the predetermined function includes therein a subroutine, the judgment unit judges whether, in response to call of the predetermined function, the data retained in the register should be compressed and then saved to the stack memory, or should be saved to the stack memory without being compressed, based on the nest information.

14. The program conversion apparatus of claim 11, wherein the conversion unit includes:

a compression information addition subunit operable to add, to a call instruction for calling the predetermined function, information indicating to the processor that the data retained in the register should be compressed and then saved to the stack memory when the predetermined function is called; and a decompression information addition subunit operable to add, to a return instruction for terminating the call of the predetermined function, information indicating to the processor that the data saved in the stack memory should be decompressed and then restored to the register when the call of the predetermined function is terminated.

15. The program conversion apparatus of claim 11, wherein the conversion unit includes:

a compression information addition subunit operable to add, to the predetermined function, information indicating to the processor that the data retained in the register should be compressed and then saved to the stack memory when a process for the predetermined function starts; and a decompression information addition subunit operable to add, to the predetermined function, information indicating to the processor that the data saved in the stack memory should be decompressed and then restored to the register when the process for the predetermined function finishes.

16. The program conversion apparatus of claim 11, wherein the conversion unit includes:

a compression information addition subunit operable to add, to the predetermined function, information indicating to the processor that the data retained in the register should be compressed and then saved to the stack memory when a process for the predetermined function starts; and a decompression information addition subunit operable to add, to the predetermined function, information indicating to the processor that the data saved in the stack memory should be decompressed and then restored to the register when the process for the predetermined function finishes.

* * * * *